United States Patent
Tachibana et al.

(10) Patent No.: US 9,731,167 B2
(45) Date of Patent: Aug. 15, 2017

(54) GOLF BALL

(71) Applicant: Dunlop Sports Co. Ltd., Kobe-shi, Hyogo (JP)

(72) Inventors: Kosuke Tachibana, Kobe (JP); Kazuhiko Isogawa, Kobe (JP); Toshiyuki Tarao, Kobe (JP)

(73) Assignee: DUNLOP SPORTS CO. LTD., Kobe-Shi, Hyogo (JP)

( * ) Notice: Subject to any disclaimer, the term of this patent is extended or adjusted under 35 U.S.C. 154(b) by 0 days.

(21) Appl. No.: 14/981,250

(22) Filed: Dec. 28, 2015

(65) Prior Publication Data

US 2016/0184650 A1    Jun. 30, 2016

(30) Foreign Application Priority Data

Dec. 26, 2014 (JP) .................................. 2014-266659

(51) Int. Cl.
*A63B 37/00* (2006.01)
*C08L 75/04* (2006.01)
(Continued)

(52) U.S. Cl.
CPC ...... *A63B 37/0022* (2013.01); *A63B 37/0029* (2013.01); *B32B 27/00* (2013.01);
(Continued)

(58) Field of Classification Search
CPC .................. A63B 37/0076; A63B 37/0022
See application file for complete search history.

(56) References Cited

U.S. PATENT DOCUMENTS 4,398,000 A * 8/1983 Kataoka ................ A63B 37/12
473/374
6,454,667 B1 * 9/2002 Iwami ................ A63B 37/0003
473/351
(Continued)

FOREIGN PATENT DOCUMENTS

JP    2011-67595 A    4/2011
JP    2011-217820 A    11/2011
JP    2011-255172 A    12/2011

OTHER PUBLICATIONS

Shore Durometer Conversion Chart—Thermal Tech Equipment Co. Inc.*

*Primary Examiner* — John E Simms, Jr.
(74) *Attorney, Agent, or Firm* — Birch, Stewart, Kolasch & Birch, LLP

(57) ABSTRACT

An object of the present invention is to provide a golf ball striking a good balance between flight distance on driver shots and spin rate on approach shots, and excellent in stain resistance and shot feeling. The present invention provides a golf ball comprising a paint film, wherein a base resin of the paint film contains a polyurethane obtained by a reaction between a polyisocyanate composition and a polyol composition containing a urethane polyol having a polyether diol with a number average molecular weight in a range from 800 to 3,000 as a constituent component, and the following requirements are satisfied:

$Mp \leq 200 \times X - 75$ $Mp \leq 100$ $Minm - Moum > 40$ $Moum - Mc < 5$ (Continued)

$$T_{inm} \geq T_{oum} > T_c > T_p$$

$$(T_{inm} \times M_{inm})/(T_{oum} \times M_{oum}) > 2.0$$

$$(T_{oum} \times M_{oum})/(T_c \times M_c) < 3.0$$

$$(T_c \times M_c)/(T_p \times M_p) > 10.0$$

[where Mp, Minm, Moum, and Mc represent a 10% elastic modulus (kgf/cm$^2$) of the paint film, inner intermediate layer, outer intermediate layer and cover, respectively; Tp, Tinm, Toum, and Tc represent a thicknesses (mm) of the paint film, inner intermediate layer, outer intermediate layer and cover, respectively; and X represents a molar ratio (NCO/OH) of a NCO group in the polyisocyanate composition to a OH group in the polyol composition.].

23 Claims, 1 Drawing Sheet

(51) Int. Cl.
| | |
|---|---|
| C09D 175/04 | (2006.01) |
| B32B 27/00 | (2006.01) |
| C08G 18/48 | (2006.01) |
| C08G 18/50 | (2006.01) |
| C08G 18/66 | (2006.01) |
| C08G 18/72 | (2006.01) |
| C08G 18/75 | (2006.01) |
| C08G 18/78 | (2006.01) |
| C08G 18/79 | (2006.01) |
| C08K 5/098 | (2006.01) |
| C08G 18/24 | (2006.01) |
| C08G 18/32 | (2006.01) |

(52) U.S. Cl.
CPC ....... *C08G 18/246* (2013.01); *C08G 18/3206* (2013.01); *C08G 18/4854* (2013.01); *C08G 18/5045* (2013.01); *C08G 18/6677* (2013.01); *C08G 18/725* (2013.01); *C08G 18/755* (2013.01); *C08G 18/7831* (2013.01); *C08G 18/792* (2013.01); *C08K 5/098* (2013.01); *C09D 175/04* (2013.01); *A63B 37/004* (2013.01); *A63B 37/0031* (2013.01); *A63B 37/0033* (2013.01); *A63B 37/0043* (2013.01); *A63B 37/0045* (2013.01); *A63B 37/0062* (2013.01); *A63B 37/0063* (2013.01); *A63B 37/0064* (2013.01); *A63B 37/0076* (2013.01); *A63B 37/0096* (2013.01); *C08L 75/04* (2013.01)

(56) References Cited

U.S. PATENT DOCUMENTS

| | | | | |
|---|---|---|---|---|
| 2002/0151382 | A1* | 10/2002 | Sullivan | A63B 37/0003 473/354 |
| 2004/0235587 | A1* | 11/2004 | Sullivan | A63B 37/008 473/371 |
| 2005/0256294 | A1* | 11/2005 | Sunkara | A63B 37/0003 528/279 |
| 2005/0282660 | A1* | 12/2005 | Isogawa | A63B 37/0003 473/378 |
| 2011/0053708 | A1 | 3/2011 | Isoagawa et al. | |
| 2011/0092315 | A1* | 4/2011 | Nakamura | A63B 37/0031 473/376 |
| 2011/0244989 | A1* | 10/2011 | Tarao | A63B 37/0022 473/385 |
| 2011/0300968 | A1 | 12/2011 | Ryu et al. | |
| 2013/0324318 | A1* | 12/2013 | Isogawa | A63B 37/0076 473/373 |
| 2013/0331205 | A1* | 12/2013 | Tarao | C08G 18/4854 473/378 |

* cited by examiner

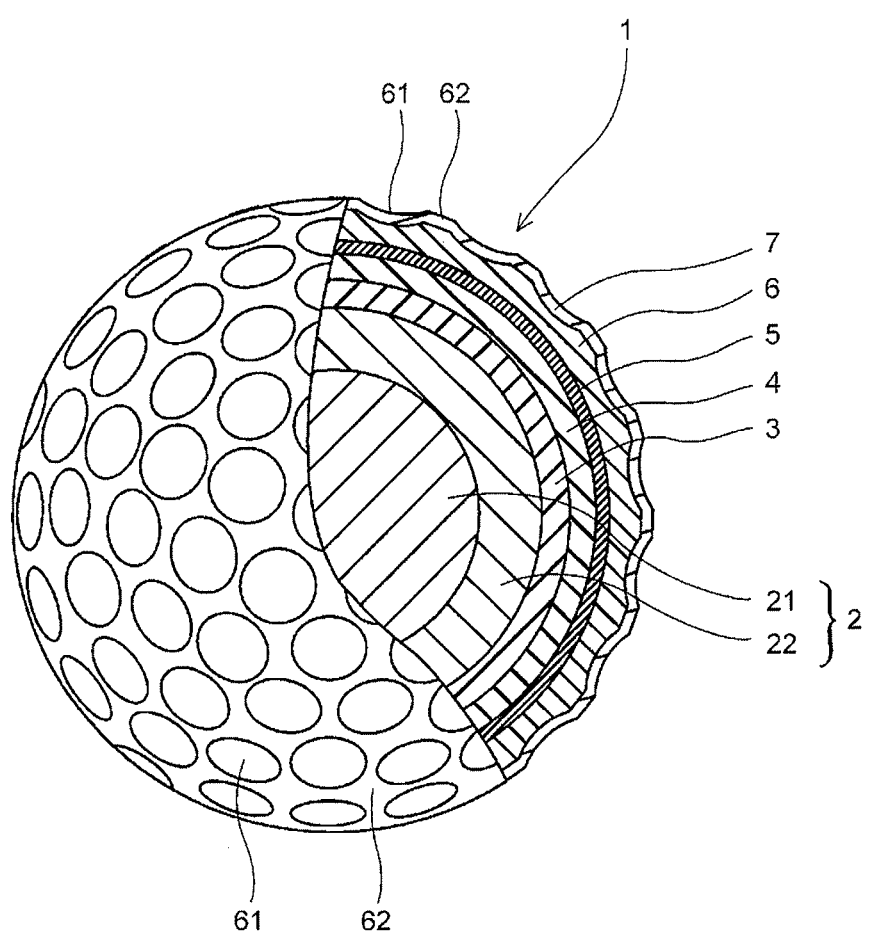

GOLF BALL

FIELD OF THE INVENTION

The present invention relates to a golf ball, and in particular, relates to a golf ball striking a good balance between a flight distance on driver shots and a spin rate on approach shots, as well as being excellent in stain resistance and shot feeling.

DESCRIPTION OF THE RELATED ART

A paint film is formed on the surface of a golf ball body. It has been proposed that the golf ball properties are improved by modifying the paint film.

For example, Japanese Patent Publication No. 2011-67595 A discloses a golf ball comprising a core, a cover disposed on an outer side of the core, and a paint layer disposed on an outer side of the cover, wherein the cover has a Shore D hardness of 61 or less, and the paint layer has a martens hardness of 2.0 mgf/μm$^2$ or less. The golf ball disclosed in Japanese Patent Publication No. 2011-67595 A is excellent in spin performance, the spin rate stability and paint layer durability.

Japanese Patent Publication No. 2011-217820 A discloses a golf ball comprising a golf ball body and a paint film formed on a surface of the golf ball body, wherein the paint film has a martens hardness of 2.0 mgf/μm$^2$ or less, and a ratio (50% elastic modulus/10% elastic modulus) of 50% elastic modulus to 10% elastic modulus is 1.6 or more. The golf ball disclosed in Japanese Patent Publication No. 2011-217820 A shows high spin rate on approach shots in a wet condition and a rough condition.

In addition, a golf ball showing an improved spin rate and a flight distance by adjusting hardness distribution of a golf ball constituent member thereof has been proposed. For example, Japanese Patent Publication No. 2011-255172 A discloses a golf ball comprising a center portion, at least two intermediate layers sequentially covering the center portion, and an outer layer covering the intermediate layers, wherein the outer layer has a Shore D hardness in a range from 40 to 50, among the intermediate layers, the first intermediate layer located just below the outer layer has a Shore D hardness in a range from 50 to 65, the other intermediate layer located just below the first intermediate layer has a Shore D hardness in a range from 30 to 70, the center portion has a Shore D hardness in a range from 30 to 70, and the golf ball has an inertia moment value of 83 g·cm$^2$ or less.

SUMMARY OF THE INVENTION

According to the conventional technology, the spin performance is improved by softening the paint film. Herein, examples of the method for softening the paint film include a method of decreasing the amount of a curing agent to decrease the crosslinking density of the paint film. However, if the crosslinking density of the paint film is decreased, the problem is that the paint film would have a low stain resistance. The present invention has been achieved in view of the above circumstances, and an object of the present invention is to provide a golf ball striking a good balance between a flight distance on driver shots and a spin rate on approach shots, as well as being excellent in stain resistance and shot feeling.

The present invention provides a golf ball comprising: a golf ball body including a spherical core, an inner intermediate layer covering the spherical core, an outer intermediate layer covering the inner intermediate layer, and a cover covering the outer intermediate layer; and a paint film formed on a surface of the golf ball body, wherein a base resin constituting the paint film contains a polyurethane obtained by a reaction between a polyol composition and a polyisocyanate composition, the polyol composition contains a urethane polyol having a polyether diol with a number average molecular weight in a range from 800 to 3,000 as a constituent component, and following requirements are satisfied:

$Mp \leq 200 \times X - 75$ $Mp \leq 100$ $Minm - Moum > 40$ $Moum - Mc < 5$ $Tinm \geq Toum > Tc > Tp$ $(Tinm \times Minm)/(Toum \times Moum) > 2.0$ $(Toum \times Moum)/(Tc \times Mc) < 3.0$ $(Tc \times Mc)/(Tp \times Mp) > 10.0$ where Mp represents a 10% elastic modulus (kgf/cm$^2$) of the paint film, Minm represents a 10% elastic modulus (kgf/cm$^2$) of the inner intermediate layer, Moum represents a 10% elastic modulus (kgf/cm$^2$) of the outer intermediate layer, and Mc represents a 10% elastic modulus (kgf/cm$^2$) of the cover; Tp represents a thickness (mm) of the paint film, Tinm represents a thickness (mm) of the inner intermediate layer, Toum represents a thickness (mm) of the outer intermediate layer, and Tc represents a thickness (mm) of the cover; and X represents a molar ratio (NCO/OH) of an isocyanate group (NCO group) of the polyisocyanate composition to a hydroxyl group (OH group) of the polyol composition.

According to the present invention, a golf ball striking a good balance between a flight distance on driver shots and a spin rate on approach shots, as well as excellent in stain resistance and shot feeling is obtained.

BRIEF DESCRIPTION OF THE DRAWINGS

The FIGURE is a partially cutaway sectional view showing a golf ball according to one embodiment of the present invention.

DESCRIPTION OF THE PREFERRED EMBODIMENT

The present invention provides a golf ball comprising: a golf ball body including a spherical core, an inner intermediate layer covering the spherical core, an outer intermediate layer covering the inner intermediate layer, and a cover covering the outer intermediate layer; and a paint film formed on a surface of the golf ball body. Further, the following requirements are satisfied:

$Mp \leq 200 \times X - 75$ $Mp \leq 100$ $Minm - Moum > 40$ $Moum - Mc < 5$ $$Tinm \geq Toum > Tc > Tp$$

$$(Tinm \times Minm)/(Toum \times Moum) > 2.0$$

$$(Toum \times Moum)/(Tc \times Mc) < 3.0$$

$$(Tc \times Mc)/(Tp \times Mp) > 10.0$$

where Mp represents a 10% elastic modulus (kgf/cm$^2$) of the paint film, Minm represents a 10% elastic modulus (kgf/cm$^2$) of the inner intermediate layer, Moum represents a 10% elastic modulus (kgf/cm$^2$) of the outer intermediate layer, and Mc represents a 10% elastic modulus (kgf/cm$^2$) of the cover; Tp represents a thickness (mm) of the paint film, Tinm represents a thickness (mm) of the inner intermediate layer, Toum represents a thickness (mm) of the outer intermediate layer, and Tc represents a thickness (mm) of the cover; and X represents a molar ratio (NCO/OH) of an isocyanate group (NCO group) of the polyisocyanate composition to a hydroxyl group (OH group) of the polyol composition.

In the golf ball of the present invention, the 10% elastic modulus and the thickness of each of the inner intermediate layer, outer intermediate layer, cover and paint film are appropriately designed. With such a configuration, a golf ball showing a high spin rate on approach shots, low spin rate on driver shots and excellent shot feeling is obtained. Further, the 10% elastic modulus Mp of the paint film and X satisfy the above relationship. In other words, even if the molar ratio (NCO/OH) is increased, the paint film is kept very soft, and thus the spin rate on approach shot is high and the stain resistance is excellent.

(Mp≤200×X−75)

The 10% elastic modulus Mp (kgf/cm$^2$) of the paint film and the molar ratio (NCO/OH) X of the isocyanate group (NCO group) of the polyisocyanate composition to the hydroxyl group (OH group) of the polyol composition satisfy the relationship shown in the following formula. The paint film satisfying the following formula remains very soft, even if the molar ratio (NCO/OH) is increased. Accordingly the resultant golf ball shows a high spin rate on approach shot and excellent stain resistance.

$$Mp \leq 200 \times X - 75$$

(Mp)

The 10% elastic modulus Mp of the paint film is 100 kgf/cm$^2$ (9.8 MPa) or less, preferably 90 kgf/cm$^2$ (8.8 MPa) or less, and more preferably 80 kgf/cm$^2$ (7.8 MPa) or less. If the 10% elastic modulus of the paint film exceeds 100 kgf/cm$^2$, the shot feeling is lowered and the spin rate on approach shots decreases. The lower limit of the 10% elastic modulus of the paint film is not particularly limited, and is preferably 5 kgf/cm$^2$ (0.49 MPa), more preferably 10 kgf/cm$^2$ (0.98 MPa). If the 10% elastic modulus of the paint film is excessively low, the paint film becomes so soft that tackiness feeling remains and the feeling becomes worse.

(Minm−Moum)

The difference (Minm−Moum) between the 10% elastic modulus Minm (kgf/cm$^2$) of the inner intermediate layer and the 10% elastic modulus Moum (kgf/cm$^2$) of the outer intermediate layer is more than 40 kgf/cm$^2$ (3.9 MPa), preferably more than 45 kgf/cm$^2$ (4.4 MPa), and even more preferably more than 50 kgf/cm$^2$ (4.9 MPa). If the difference (Minm−Moum) is 40 kgf/cm$^2$ or less, the spin rate on driver shots increases, and the flight distance decreases or the spin rate on approach shots decreases. The upper limit of the difference (Minm−Moum) is not limited, but is generally 300 kgf/cm$^2$ (29.4 MPa), preferably 270 kgf/cm$^2$ (26.5 MPa), and more preferably 240 kgf/cm$^2$ (23.5 MPa).

(Moum−Mc)

The difference (Moum−Mc) between the 10% elastic modulus Moum (kgf/cm$^2$) of the outer intermediate layer and the 10% elastic modulus Mc (kgf/cm$^2$) of the cover is less than 5 kgf/cm$^2$ (0.49 MPa), preferably less than 3 kgf/cm$^2$ (0.29 MPa), and even more preferably less than 0 kgf/cm$^2$ (0 MPa). If the difference (Moum−Mc) is 5 kgf/cm$^2$ or more, the spin rate on driver shots increases, and the flight distance decreases or the spin rate on approach shots decreases. The lower limit of the difference (Moum−Mc) is not limited, but is generally −60 kgf/cm$^2$ (−5.9 MPa), preferably −50 kgf/cm$^2$ (−4.9 MPa), and more preferably −40 kgf/cm$^2$ (−3.9 MPa).

(|Mp−Mc|)

The absolute value (|Mp−Mc|) of the difference between the 10% elastic modulus Mp (kgf/cm$^2$) of the paint film and the 10% elastic modulus Mc (kgf/cm$^2$) of the cover is preferably 65 kgf/cm$^2$ (6.4 MPa) or less, more preferably 60 kgf/cm$^2$ (5.9 MPa) or less, and even more preferably 55 kgf/cm$^2$ (5.4 MPa) or less. If the absolute value (|Mp−Mc|) is 65 kgf/cm$^2$ or less, the shot feeling is enhanced, and the spin rate on approach shots increases. The lower limit of the absolute value (|Mp−Mc|) is 0.

(Tinm≥Toum>Tc>Tp)

The thickness Tinm of the inner intermediate layer is larger than or equal to the thickness Toum of the outer intermediate layer (Tinm≥Toum), the thickness Toum of the outer intermediate layer is larger than the thickness Tc of the cover (Toum>Tc), and the thickness Tc of the cover is larger than the thickness Tp of the paint film (Tc>Tp). In the case that the thickness Tinm of the inner intermediate layer is smaller than the thickness Toum of the outer intermediate layer, the thickness Toum of the outer intermediate layer is smaller than or equal to the thickness Tc of the cover, or the thickness Tc of the cover is smaller than or equal to the thickness Tp of the paint film, the spin rate on driver shots increases, and the flight distance decreases or the spin rate on approach shots decreases.

((Tinm×Minm)/(Toum×Moum))

The ratio ((Tinm×Minm)/(Toum×Moum)) of the product (Tinm×Minm) obtained by multiplying the thickness Tinm (mm) by the 10% elastic modulus Minm (kgf/cm$^2$) of the inner intermediate layer to the product (Toum×Moum) obtained by multiplying the thickness Toum (mm) by the 10% elastic modulus Moum (kgf/cm$^2$) of the outer intermediate layer is more than 2.0, preferably more than 2.1, and more preferably more than 2.2. If the ratio ((Tinm×Minm)/(Toum×Moum)) is 2.0 or less, the spin rate on driver shots increases, and the flight distance decreases or the spin rate on approach shots decreases. The upper limit of the ratio ((Tinm×Minm)/(Toum×Moum)) is not limited, but is preferably 8.0 or less, more preferably 7.0 or less, and even more preferably 6.0 or less.

((Toum×Moum)/(Tc×Mc))

The ratio ((Toum×Moum)/(Tc×Mc)) of the product (Toum×Moum) obtained by multiplying the thickness Toum (mm) by the 10% elastic modulus Moum (kgf/cm$^2$) of the outer intermediate layer to the product (Tc×Mc) obtained by multiplying the thickness Tc (mm) by the 10% elastic modulus Mc (kgf/cm$^2$) of the cover is less than 3.0, preferably less than 2.8, and more preferably less than 2.5. If the ratio ((Toum×Moum)/(Tc×Mc)) is 3.0 or more, the spin rate on driver shots increases, and the flight distance decreases or the spin rate on approach shots decreases. The lower limit of the ratio ((Toum×Moum)/(Tc×Mc)) is not limited, but is preferably 0.5, more preferably 0.7, and even more preferably 1.0.

((Tc×Mc)/(Tp×Mp))

The ratio ((Tc×Mc)/(Tp×Mp)) of the product (Tc×Mc) obtained by multiplying the thickness Tc (mm) by the 10% elastic modulus Mc (kgf/cm$^2$) of the cover to the product (Tp×Mp) obtained by multiplying the thickness Tp (mm) by the 10% elastic modulus Mp (kgf/cm$^2$) of the paint film is more than 10.0, preferably more than 12.0, and more preferably more than 15.0. If the ratio ((Tc×Mc)/(Tp×Mp)) is 10.0 or less, the spin rate on driver shots increases, and the flight distance decreases or the spin rate on approach shots decreases. The upper limit of the ratio ((Tc×Mc)/(Tp×Mp)) is not limited, but is preferably 60.0, more preferably 55.0, and even more preferably 50.0.

(Tp×Mp)

The product (Tp×Mp) obtained by multiplying the thickness Tp (mm) by the 10% elastic modulus Mp (kgf/cm$^2$) of the paint film is preferably 0.2 or more, more preferably 0.4 or more, and even more preferably 0.5 or more, and is preferably 4.0 or less, more preferably 3.0 or less, and even more preferably 2.5 or less. If the product (Tp×Mp) is 0.2 or more, the stain resistance is further enhanced, and if the product (Tp×Mp) is 4.0 or less, the spin performance on approach shots is further enhanced.

(Tinm×Minm)

The product (Tinm×Minm) obtained by multiplying the thickness Tinm (mm) by the 10% elastic modulus Minm (kgf/cm$^2$) of the inner intermediate layer is preferably 100 or more, more preferably 120 or more, even more preferably 140 or more, and particularly preferably 160 or more, and is preferably 400 or less, more preferably 370 or less, and even more preferably 340 or less. If the product (Tinm×Minm) is 120 or more, the spin rate on driver shots decreases and the flight distance further increases, and if the product (Tinm×Minm) is 400 or less, the spin performance on approach shots is further enhanced.

(Toum×Moum)

The product (Toum×Moum) obtained by multiplying the thickness Toum (mm) by the 10% elastic modulus Moum (kgf/cm$^2$) of the outer intermediate layer is preferably 30 or more, more preferably 35 or more, and even more preferably 40 or more, and is preferably 120 or less, more preferably 110 or less, and even more preferably 100 or less. If the product (Toum×Moum) is 30 or more, the spin rate on driver shots decreases and the flight distance further increases, and if the product (Toum×Moum) is 120 or less, the spin performance on approach shots is enhanced.

(Tc×Mc)

The product (Tc×Mc) obtained by multiplying the thickness Tc (mm) by the 10% elastic modulus Mc (kgf/cm$^2$) of the cover is preferably 5.0 or more, more preferably 6.0 or more, and even more preferably 7.0 or more, and is preferably 60.0 or less, more preferably 55.0 or less, and even more preferably 50.0 or less. If the product (Tc×Mc) is 5.0 or more, the spin performance on approach shots is further enhanced, and if the product (Tc×Mc) is 60.0 or less, the spin rate on driver shots decreases and the flight distance further increases.

[Paint Film]

Hereinafter, each constituent member of the golf ball of the present invention will be explained. The golf ball of the present invention comprises a golf ball body and a paint film formed on a surface of the golf ball body. A base resin constituting the paint film contains a polyurethane obtained by a reaction between a polyol composition and a polyisocyanate composition.

The polyol composition contains a urethane polyol having a polyether diol with a number average molecular weight in a range from 800 to 3,000 as a constituent component. If such a urethane polyol is used, the obtained paint film is soft, and thus the spin performance on approach shots is enhanced. The urethane polyol is a compound having a plurality of urethane bonds within its molecule and having two or more hydroxyl groups in one molecule thereof. Examples of the urethane polyol include a urethane prepolymer obtained by a reaction between a polyol and a polyisocyanate under a condition that the hydroxyl group of the polyol is excessive to the isocyanate group of the polyisocyanate.

Examples of the polyether diol that constitutes the urethane polyol include polyoxyethylene glycol, polyoxypropylene glycol, and polyoxytetramethylene glycol. Among them, polyoxytetramethylene glycol is preferred.

The number average molecular weight of the polyether diol is 800 or more, preferably 900 or more, and more preferably 1,000 or more, and is 3,000 or less, preferably 2,000 or less, and more preferably 1,500 or less. If the number average molecular weight of the polyether diol is 800 or more, the distance between crosslinking points in the paint film becomes long and the paint film becomes soft, thus the spin performance is enhanced. If the number average molecular weight is 3,000 or less, the distance between crosslinking points in the paint film does not become excessively long, and thus the stain resistance of the paint film becomes better. It is noted that the number average molecular weight of the polyol component can be measured, for example, by gel permeation chromatography (GPC), using polystyrene as a standard material, tetrahydrofuran as an eluate, and an organic solvent system GPC column (e.g. "Shodex (registered trademark) KF series" manufactured by Showa Denko K.K.) as a column.

The urethane polyol may further include, as the polyol component, a low molecular weight polyol having a molecular weight of less than 500 other than the polyether diol. Examples of the low molecular weight polyol include a diol such as ethylene glycol, diethylene glycol, triethylene glycol, 1,3-butanediol, 1,4-butanediol, neopentyl glycol, and 1,6-hexanediol; and a triol such as glycerin, trimethylolpropane, and hexanetriol. The low molecular weight polyol may be used solely or as a mixture of two or more of them.

The urethane polyol preferably includes a triol component and a diol component as the polyol component. Trimethylolpropane is preferred as the triol component. A mixing ratio (triol component/diol component) of the triol component to the diol component is preferably 0.2 or more, more preferably 0.5 or more, and is preferably 6.0 or less, more preferably 5.0 or less in a mass ratio.

The polyisocyanate component that constitutes the urethane polyol is not particularly limited, as long as it is a compound having at least two isocyanate groups. Examples of the polyisocyanate component include an aromatic polyisocyanate such as 2,4-toluene diisocyanate, 2,6-toluene diisocyanate, a mixture of 2,4-toluene diisocyanate and 2,6-toluene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI), and para-phenylene diisocyanate (PPDI); and an alicyclic polyisocyanate or aliphatic polyisocyanate such as 4,4'-dicyclohexylmethane diisocyanate ($H_{12}$MDI), hydrogenated xylylene diisocyanate ($H_6XDI$), hexamethylene diisocyanate (HDI), isophorone diisocyanate (IPDI), and norbornene diisocyanate (NBDI). These polyisocyanates may be used solely or as a mixture of two or more of them.

The content of the polyether diol with a number average molecular weight in a range from 800 to 3,000 in the urethane polyol is preferably 70 mass % or more, more preferably 72 mass % or more, and even more preferably 75 mass % or more. The polyether diol with a number average molecular weight in a range from 800 to 3,000 forms a soft segment in the paint film. Accordingly, if the content of the polyether diol is 70 mass % or more, the obtained golf ball shows further enhanced spin performance.

The weight average molecular weight of the urethane polyol is preferably 5,000 or more, more preferably 5,300 or more, and even more preferably 5,500 or more, and is preferably 20,000 or less, more preferably 18,000 or less, and even more preferably 16,000 or less. If the weight average molecular weight of the urethane polyol is 5,000 or more, the distance between crosslinking points in the paint film becomes long and the paint film becomes soft, thus the spin performance is enhanced. If the weight average molecular weight is 20,000 or less, the distance between crosslinking points in the paint film does not become excessively long, and thus the stain resistance of the paint film becomes better.

The hydroxyl value of the urethane polyol is preferably 10 mg KOH/g or more, more preferably 15 mg KOH/g or more, and even more preferably 20 mg KOH/g or more, and is preferably 200 mg KOH/g or less, more preferably 190 mg KOH/g or less, and even more preferably 180 mg KOH/g or less.

The polyol composition may further contain, as the polyol compound, a polyol compound other than the urethane polyol. Examples of the other polyol compound include a low molecular weight polyol having a molecular weight of less than 500 and a high molecular weight polyol having an average molecular weight of 500 or more. Examples of the low molecular weight polyol include a diol such as ethylene glycol, diethylene glycol, triethylene glycol, 1,3-butanediol, 1,4-butanediol, neopentyl glycol, and 1,6-hexanediol; and a triol such as glycerin, trimethylolpropane, and hexanetriol. Examples of the high molecular weight polyol include a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; and an acrylic polyol. The other polyol compound may be used solely or as a mixture of two or more of them.

The content of the urethane polyol in the polyol compound contained in the polyol composition is preferably 60 mass % or more, more preferably 70 mass % or more, and even more preferably 80 mass % or more. The polyol compound of the polyol composition preferably consists of the urethane polyol.

The hydroxyl value of the polyol contained in the polyol composition is preferably 10 mg KOH/g or more, more preferably 15 mg KOH/g or more, and even more preferably 20 mg KOH/g or more, and is preferably 400 mg KOH/g or less, more preferably 300 mg KOH/g or less, even more preferably 200 mg KOH/g or less, particularly preferably 170 mg KOH/g or less, and most preferably 160 mg KOH/g or less. If the hydroxyl value of the polyol component falls within the above range, the adhesion between the paint film and the golf ball body is enhanced. It is noted that, in the present invention, the hydroxyl value can be measured by, for example, an acetylization method, in accordance with JIS K 1557-1.

Specific examples of the polyol compound include 121B manufactured by Wayaku Paint Co. Ltd.; Nippollan 800 and Nippollan 1100 manufactured by Nippon Polyurethane Industry Co., Ltd.; Burnock D6-627, Burnock D8-436, Burnock D8-973, and Burnock 11-408 manufactured by DIC Corporation; Desmophen 650MPA, Desmophen 670, Desmophen 1150, and Desmophen A160X manufactured by Sumika Bayer Urethane Co., Ltd.; and Hariacron 2000 and Hariacron 8500H manufactured by Harima Chemicals, Inc.

Next, the polyisocyanate composition will be described. The polyisocyanate composition contains one or two or more polyisocyanate compounds. Examples of the polyisocyanate compound include a compound having at least two isocyanate groups.

Examples of the polyisocyanate compound include an aromatic diisocyanate such as 2,4-toluene diisocyanate, 2,6-toluene diisocyanate, a mixture of 2,4-toluene diisocyanate and 2,6-toluene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI), and para-phenylene diisocyanate (PPDI); an alicyclic diisocyanate or aliphatic diisocyanate such as 4,4'-dicyclohexylmethane diisocyanate ($H_{12}MDI$), hydrogenated xylylene diisocyanate ($H_6XDI$), hexamethylene diisocyanate (HDI), isophorone diisocyanate (IPDI), and norbornene diisocyanate (NBDI); and a triisocyanate such as an allophanate product, a biuret product, an isocyanurate product and an adduct of the above diisocyanates. In the present invention, two or more of the polyisocyanates are preferably used.

The allophanate product is, for example, a triisocyanate obtained by further reacting a diisocyanate with a urethane bond formed through a reaction between a diisocyanate and a low molecular weight diol. The adduct is a triisocyanate obtained through a reaction between a diisocyanate and a low molecular weight triol such as trimethylolpropane or glycerin. The biuret product is, for example, a triisocyanate having a biuret bond represented by the following chemical formula (1). The isocyanurate product of the diisocyanate is, for example, a triisocyanate represented by the following chemical formula (2).

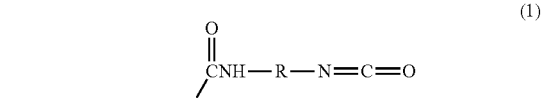

(1)

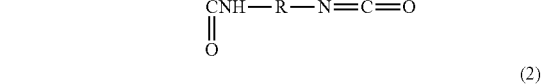

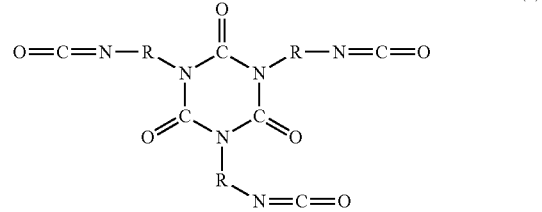

(2)

In the chemical formulae (1) and (2), R represents a residue where isocyanate groups are removed from the diisocyanate.

As the triisocyanate, an isocyanurate product of hexamethylene diisocyanate, a biuret product of hexamethylene diisocyanate, and an isocyanurate product of isophorone diisocyanate are preferable. In particular, in case of using the biuret product of hexamethylene diisocyanate and the isocyanurate product of hexamethylene diisocyanate in combination, a mixing ratio (biuret product/isocyanurate product) thereof preferably ranges from 20/40 to 40/20, and more preferably ranges from 25/35 to 35/25 in a mass ratio.

In the present invention, the polyisocyanate composition preferably contains the triisocyanate compound. The content of the triisocyanate compound in the polyisocyanate contained in the poisocyanate composition is preferably 50 mass % or more, more preferably 60 mass % or more, and even more preferably 70 mass % or more. It is most preferable that the polyisocyanate compound of the polyisocyanate composition consists of the triisocyanate compound.

The content of the isocyanate group (NCO %) in the polyisocyanate contained in the polyisocyanate composition is preferably 0.5 mass % or more, more preferably 1 mass % or more, and even more preferably 2 mass % or more, and is preferably 45 mass % or less, more preferably 40 mass % or less, and even more preferably 35 mass % or less. It is noted that the content of the isocyanate group (NCO %) in the polyisocyanate can be defined by the following expression.

NCO (%)=100×[mole number of the isocyanate group in the polyisocyanate ×42(molecular weight of NCO)]/[total mass (g) of the polyisocyanate]

Specific examples of the polyisocyanate include Burnock D-800, Burnock DN-950, and Burnock DN-955 manufactured by DIC corporation; Desmodur N75MPA/X, Desmodur N3300, Desmodur L75 (C), and Sumidur E21-1 manufactured by Sumika Bayer Urethane Co., Ltd.; Coronate HX and Coronate HK manufactured by Nippon Polyurethane Industry Co., Ltd.; Duranate 24A-100, Duranate 21S-75E, Duranate TPA-100, and Durante TKA-100 manufactured by Asahi Kasei Chemicals Corporation; and VESTANAT T1890 manufactured by Degussa.

In the reaction between the polyol composition and the polyisocyanate composition, the molar ratio (NCO group/OH group) of the isocyanate group (NCO group) of the polyisocyanate composition to the hydroxyl group (OH group) of the polyol composition is preferably more than 0.5, more preferably 0.55 or more, and even more preferably 0.60 or more. If the molar ratio (NCO group/OH group) is more than 0.5, the crosslinking density increases, and thus the obtained paint film shows better stain resistance. On the other hand, if the molar ratio (NCO group/OH group) is excessively large, the amount of the isocyanate groups becomes excessive, thus the obtained paint film may become hard and fragile, and the appearance thereof may deteriorate. For this reason, the molar ratio (NCO group/OH group) is preferably 1.20 or less, more preferably 1.15 or less, and even more preferably 1.10 or less. The reason why the appearance of the obtained paint film deteriorates if the amount of the isocyanate groups is excessive in the paint is considered that if the amount of the isocyanate groups is excessive, the moisture in air and the isocyanate group react more frequently, thereby generating a lot of carbon dioxide gas.

The paint film of the golf ball according to the present invention is preferably formed from a paint containing the polyol composition and the polyisocyanate composition. Examples of the paint include a so-called two-component curing type paint including a polyol as the base agent and a polyisocyanate as the curing agent. The paint may be either a waterborne paint mainly containing water as a dispersion medium or a solvent-based paint mainly containing an organic solvent as a dispersion medium. In case of the solvent-based paint, preferable examples of the solvent include toluene, isopropyl alcohol, xylene, methyl ethyl ketone, methyl ethyl isobutyl ketone, ethylene glycol monomethyl ether, ethylbenzene, propylene glycol monomethyl ether, isobutyl alcohol, and ethyl acetate.

If necessary, the paint may further contain an additive that is generally contained in a golf ball paint, such as a filler, an ultraviolet absorber, an antioxidant, a light stabilizer, a fluorescent brightener, an anti-blocking agent, a leveling agent, a slip agent, and a viscosity modifier.

Next, the method of applying the curing type paint according to the present invention will be described. The method of applying the curing type paint is not limited, and a conventionally known method such as a spray coating method or an electrostatic coating method can be employed.

In case of spray coating using an air gun, the polyol composition and the polyisocyanate composition may be fed with respective pumps and continuously mixed with a line mixer located in the stream line just before the air gun, and the obtained mixture is subjected to spray coating. Alternatively, the polyol composition and the polyisocyanate composition may be subjected to spray coating separately by using an air spray system provided with a mixing ratio controlling device. The paint application may be conducted by spray coating one time or overspraying several times.

The curing type paint applied to the golf ball body can be dried, for example, at a temperature ranging from 30° C. to 70° C. for 1 hour to 24 hours to form the paint film.

(Tp)

The thickness Tp of the paint film after drying is preferably 5 μm or more, more preferably 10 μm or more, and even more preferably 15 μm or more. If the thickness of the paint film is less than 5 μm, the paint film tends to be easily wear off due to the continued use of the golf ball. Thickening the paint film increases the spin rate on approach shots. Further, the thickness of the paint film is preferably 50 μm or less, more preferably 45 μm or less, and even more preferably 40 μm or less. If the thickness of the paint film exceeds 50 μm, the dimple effect may be lowered, and thus the flying performance of the golf ball tends to be lowered. The thickness of the paint film can be measured, for example, by observing the cross section of the golf ball using a microscope (VHX-1000 manufactured by Keyence Corporation). In case of overpainting the paint, a total thickness of the formed paint film preferably falls within the above range.

[Golf Ball Body]

The golf ball body comprises a spherical core, an inner intermediate layer covering the spherical core, an outer intermediate layer covering the inner intermediate layer, and a cover covering the outer intermediate layer.

[Spherical Core]

The construction of the spherical core is not limited, and may be a single-layered construction or a multi-layered construction comprising two layers or more. From the viewpoint of easily designing the hardness, a dual-layered core composed of a spherical inner core and an outer core covering the inner core is preferred.

The hardness difference (Hs—Ho) between the surface hardness Hs and the center hardness Ho of the spherical core is preferably 20 or more, more preferably 24 or more, and even more preferably 28 or more in Shore C hardness. If the hardness difference (Hs—Ho) is 20 or more, the spin rate on driver shots decreases, and thus the flight distance increases. The upper limit of the hardness difference (Hs—Ho) is not particularly limited, but is preferably 50 or less, more preferably 45 or less, and even more preferably 40 or less in Shore C hardness.

The center hardness Ho of the spherical core is preferably 40 or more, more preferably 50 or more, and even more preferably 55 or more in Shore C hardness. If the center hardness Ho of the spherical core is 40 or more in Shore C hardness, the resilience becomes better. In addition, the center hardness Ho of the spherical core is preferably 80 or less, more preferably 76 or less, and even more preferably 72 or less in Shore C hardness. If the center hardness Ho is 80 or less in Shore C hardness, the spin rate on driver shots decreases.

The surface hardness Hs of the spherical core is preferably 80 or more, more preferably 82 or more, and even more preferably 84 or more, and is preferably 96 or less, more preferably 94 or less, and even more preferably 92 or less in Shore C hardness. If the surface hardness of the spherical core is 80 or more in Shore C hardness, the spin rate on driver shots decreases. In addition, if the surface hardness of the spherical core is 96 or less in Shore C hardness, the spherical core does not become excessively hard, and thus the durability thereof becomes better.

The diameter of the spherical core is preferably 37.0 mm or more, more preferably 37.5 mm or more, and even more preferably 38.5 mm or more. If the diameter of the spherical core is 37.0 mm or more, the resilience becomes better. The upper limit of the spherical core is not particularly limited, and is preferably 40.5 mm or less, more preferably 40.0 mm or less, and even more preferably 39.5 mm or less.

When the spherical core has a diameter in a range from 37.0 mm to 40.5 mm, the compression deformation amount of the spherical core (shrinking amount of the core along the compression direction) when applying a load from 98 N as an initial load to 1275 N as a final load to the core is preferably 2.3 mm or more, more preferably 2.5 mm or more, and is preferably 4.5 mm or less, more preferably 4.2 mm or less. If the compression deformation amount is 2.3 mm or more, the shot feeling becomes better, and if the compression deformation amount is 4.5 mm or less, the resilience becomes better.

The spherical core may employ a conventionally known rubber composition (hereinafter, sometimes simply referred to as "core rubber composition"), and can be formed by, for example, heat-pressing a rubber composition containing a base rubber, a co-crosslinking agent, and a crosslinking initiator.

As the base rubber, typically preferred is a high cis-polybutadiene having cis-bond in a proportion of 40 mass % or more, more preferably 70 mass % or more, and even more preferably 90 mass % or more in view of its superior resilience property.

The co-crosslinking agent is preferably an α,β-unsaturated carboxylic acid having 3 to 8 carbon atoms or a metal salt thereof, and more preferably a metal salt of acrylic acid or a metal salt of methacrylic acid. The metal constituting the metal salt is preferably zinc, magnesium, calcium, aluminum or sodium, more preferably zinc. The amount of the co-crosslinking agent is preferably 20 parts by mass or more and 50 parts by mass or less with respect to 100 parts by mass of the base rubber.

As the crosslinking initiator, an organic peroxide is preferably used. Specific examples of the organic peroxide include dicumyl peroxide, 1,1-bis(t-butylperoxy)-3,3,5-trimethylcyclohexane, 2,5-dimethyl-2,5-di(t-butylperoxy)hexane, and di-t-butyl peroxide. Among them, dicumyl peroxide is preferably used. The amount of the crosslinking initiator is preferably 0.2 part by mass or more, more preferably 0.3 part by mass or more, and is preferably 3 parts by mass or less, more preferably 2 parts by mass or less, with respect with 100 parts by mass of the base rubber.

Further, the core rubber composition may further contain an organic sulfur compound. As the organic sulfur compound, diphenyl disulfide or a derivate thereof, thiophenol or a derivate thereof, and thionaphthol or a derivate thereof are preferably used. The amount of the organic sulfur compound is preferably 0.1 part by mass or more, more preferably 0.3 part by mass or more, and is preferably 5.0 parts by mass or less, more preferably 3.0 parts by mass or less, with respect with 100 parts by mass of the base rubber.

The core rubber composition may further contain a fatty acid and/or a metal salt thereof. The fatty acid may be any one of a saturated fatty acid and an unsaturated fatty acid, but the saturated fatty acid is preferable. Examples of the saturated fatty acid include caprylic acid (octanoic acid), pelargonic acid (nonanoic acid), capric acid (decanoic acid), lauric acid, myristic acid, palmitic acid, stearic acid, and behenic acid. As the metal of the metal salt, zinc, magnesium, calcium, aluminum, and sodium are preferable, and zinc is more preferable. It is noted that the fatty acid and/or the metal salt thereof excludes the α,β-unsaturated carboxylic acid having 3 to 8 carbon atoms and/or the metal salt thereof used as the co-crosslinking agent.

The content of the fatty acid and/or the metal salt thereof is preferably 1 part by mass or more and 40 parts by mass or less with respect to 100 parts by mass of the base rubber. It is noted that sometimes the surface of zinc acrylate used as the co-crosslinking agent is treated with zinc stearate to improve the dispersibility of zinc acrylate to the rubber. In case of using such zinc acrylate whose surface is treated with zinc stearate, the amount of zinc stearate used as a surface treating agent is included in the content of the fatty acid and/or the metal salt thereof.

The core rubber composition may appropriately further contain a weight adjusting agent such as zinc oxide and barium sulfate, an antioxidant, a color powder or the like, in addition to the base rubber, the co-crosslinking agent, the crosslinking initiator, and the organic sulfur compound. The molding conditions for heat-pressing the core rubber composition should be determined appropriately depending on the formulation of the rubber composition. Generally, it is preferred that the molding is carried out by heating the core rubber composition at a temperature ranging from 130° C. to 200° C. for 10 minutes to 60 minutes, alternatively, by molding the core rubber composition in a two-step heating, i.e. at a temperature ranging from 130° C. to 150° C. for 20 minutes to 40 minutes, and then at a temperature ranging from 160° C. to 180° C. for 5 minutes to 15 minutes.

[Inner Intermediate Layer]

The golf ball body comprises an inner intermediate layer disposed on the outer side of the spherical core. The inner intermediate layer has a relatively large 10% elastic modulus value. Disposing such an inner intermediate layer can decrease the spin rate on driver shots of the golf ball.

(Tinm)

The thickness Tinm of the inner intermediate layer is preferably 0.7 mm or more, more preferably 0.8 mm or more, and even more preferably 0.9 mm or more, and is preferably 1.6 mm or less, more preferably 1.4 mm or less, and even more preferably 1.2 mm or less. If the thickness of the inner intermediate layer is 0.7 mm or more, the durability of the golf ball is enhanced, and if the thickness of the inner intermediate layer is 1.6 mm or less, the core has a relatively large diameter, and thus the resilience performance is enhanced.

(Minm)

The 10% elastic modulus Minm of the inner intermediate layer is preferably 120 kgf/cm$^2$ (11.8 MPa) or more, more preferably 140 kgf/cm$^2$ (13.7 MPa) or more, and even more preferably 160 kgf/cm$^2$ (15.7 MPa) or more. If the 10% elastic modulus Minm of the inner intermediate layer is 120 kgf/cm$^2$ or more, the spin rate on driver shots decreases and thus the flight distance increases. The upper limit of the 10% elastic modulus of the inner intermediate layer is not limited, but is preferably 400 kgf/cm$^2$ (39.2 MPa), more preferably 370 kgf/cm$^2$ (36.3 MPa).

(Hinm)

The hardness of the inner intermediate layer is preferably 62 or more, more preferably 65 or more, and even more preferably 68 or more, and is preferably 75 or less, more preferably 74 or less, and even more preferably 73 or less in Shore D hardness. If the hardness is 62 or more in Shore D hardness, the spin rate on driver shots decreases and thus the flight distance further increases. In addition, if the hardness is 75 or less, the shot feeling is enhanced and the spin rate on approach shots also increases. The hardness of the inner intermediate layer is a slab hardness obtained by molding the intermediate layer composition for forming the inner intermediate layer into a sheet form and measuring the hardness of the sheet.

(Vinm)

The proportion occupied by the volume Vinm of the inner intermediate layer in the golf ball body is preferably 7.0 vol % or more, more preferably 8.0 vol % or more, and even more preferably 9.0 vol % or more, and is preferably 18.0 vol % or less, more preferably 16.0 vol % or less, and even more preferably 14.0 vol % or less. If the proportion is 7.0 vol % or more, the spin rate on driver shots decreases and thus the flight distance further increases. In addition, if the proportion is 14.0 vol % or less, the spin rate on approach shots also increases. It is noted that the volume of the golf ball body is a volume when assuming no dimples are formed on the golf ball body.

[Outer Intermediate Layer]

The golf ball body comprises an outer intermediate layer disposed on the outer side of the inner intermediate layer. The outer intermediate layer has a smaller 10% elastic modulus value than the inner intermediate layer. Disposing such an outer intermediate layer can enhance the shot feeling, and strike a good balance between the flight distance on driver shots and the spin rate on approach shots.

(Toum)

The thickness Toum of the outer intermediate layer is preferably 0.5 mm or more, more preferably 0.6 mm or more, and even more preferably 0.7 mm or more, and is preferably 1.2 mm or less, more preferably 1.0 mm or less, and even more preferably 0.9 mm or less. If the thickness of the outer intermediate layer is 0.5 mm or more, the durability of the golf ball is enhanced, and if the thickness of the outer intermediate layer is 1.2 mm or less, the spin rate on driver shots decreases and thus the flight distance increases.

(Moum)

The 10% elastic modulus Moum of the outer intermediate layer is preferably 35 kgf/cm$^2$ (3.4 MPa) or more, more preferably 40 kgf/cm$^2$ (3.9 MPa) or more, and even more preferably 45 kgf/cm$^2$ (4.4 MPa) or more. If the 10% elastic modulus Moum of the outer intermediate layer is 35 kgf/cm$^2$ or more, the spin rate on driver shots decreases and thus the flight distance increases. The upper limit of the 10% elastic modulus of the outer intermediate layer is not limited, but is preferably less than 105 kgf/cm$^2$ (10.3 MPa), more preferably 100 kgf/cm$^2$ (9.8 MPa), and even more preferably 90 kgf/cm$^2$ (8.8 MPa).

(Houm)

The hardness of the outer intermediate layer is preferably 42 or more, more preferably 45 or more, and even more preferably 48 or more, and is preferably 63 or less, more preferably 62 or less, and even more preferably 61 or less in Shore D hardness. If the hardness is 42 or more in Shore D hardness, the spin rate on driver shots decreases and thus the flight distance further increases. In addition, if the hardness is 63 or less in Shore D hardness, the spin rate on approach shots also increases. The hardness of the outer intermediate layer is a slab hardness obtained by molding the intermediate layer composition for forming the outer intermediate layer into a sheet form and measuring the hardness of the sheet.

(Voum)

The proportion occupied by the volume Voum of the outer intermediate layer in the golf ball body is preferably 6.0 vol % or more, more preferably 7.0 vol % or more, and even more preferably 8.0 vol % or more, and is preferably 15.0 vol % or less, more preferably 14.0 vol % or less, and even more preferably 13.0 vol % or less. If the proportion is 6.0 vol % or more, the spin rate on driver shots decreases and thus the flight distance further increases. In addition, if the proportion is 15.0 vol % or less, the spin rate on approach shots also increases. It is noted that the volume of the golf ball body is a volume when assuming no dimples are formed on the golf ball body.

Examples of the material constituting the inner intermediate layer and outer intermediate layer include a thermoplastic resin such as a polyurethane resin, an ionomer resin, a polyamide resin, and polyethylene; a thermoplastic elastomer such as a styrene elastomer, a polyolefin elastomer, a polyurethane elastomer, and a polyester elastomer; and a cured product of a rubber composition. Herein, examples of the ionomer resin include a product obtained by neutralizing at least a part of carboxyl groups in a copolymer composed of ethylene and an α,β-unsaturated carboxylic acid with a metal ion; and a product obtained by neutralizing at least a part of carboxyl groups in a terpolymer composed of ethylene, an α,β-unsaturated carboxylic acid and an α,β-unsaturated carboxylic acid ester with a metal ion. The inner intermediate layer and outer intermediate layer may further contain a weight adjusting agent such as barium sulfate and tungsten, an antioxidant, and a pigment.

Specific examples of the material of the inner intermediate layer and the outer intermediate layer include an ionomer resin having a trade name of "Himilan (registered trademark)" or an ethylene-methacrylic acid copolymer having a trade name of "Nucrel (registered trademark)" commercially available from Du Pont-Mitsui Polychemicals Co., Ltd.; a thermoplastic polyurethane elastomer having a trade name of "Elastollan (registered trademark)" commercially available from BASF Japan Ltd.; a thermoplastic polyimide elastomer having a trade name of "Pebax (registered trademark)" commercially available from Arkema Inc.; a thermoplastic polyester elastomer having a trade name of "Hytrel (registered trademark)" commercially available from Du Pont-Toray Co., Ltd.; a thermoplastic styrene elastomer having a trade name of "Rabalon (registered trademark)" or a thermoplastic polyester elastomer having a trade name of "Primalloy (registered trademark)" commercially available from Mitsubishi Chemical Corporation; and the like. These materials of the inner intermediate layer and the outer intermediate layer may be used solely or as a mixture of at least two of them.

The inner intermediate layer may be formed by injection molding an intermediate layer composition directly on the spherical core. In addition, the outer intermediate layer may be formed by injection molding an intermediate layer composition directly on the inner intermediate layer.

[Cover]

The golf ball body comprises a cover disposed on the outer side of the outer intermediate layer. The 10% elastic modulus value of the cover is equal to or larger than that of the outer intermediate layer. If such a cover is disposed, the spin rate on driver shots decreases and thus the flight distance further increases.

(Tc)

The thickness Tc of the cover is preferably 0.1 mm or more, more preferably 0.2 mm or more, and is preferably 0.6 mm or less, more preferably 0.5 mm or less, even more preferably 0.4 mm or less, and particularly preferably 0.3 mm or less. If the thickness of the cover is 0.1 mm or more, the spin rate on approach shots further increases, and if the thickness of the cover is 0.6 mm or less, the spin rate on driver shots decreases and thus the flight distance further increases.

(Mc)

The 10% elastic modulus Mc of the cover is preferably 100 kgf/cm$^2$ (9.8 MPa) or less, more preferably 90 kgf/cm$^2$ (8.8 MPa) or less, and even more preferably 80 kgf/cm$^2$ (7.8 MPa) or less. If the 10% elastic modulus of the cover is 100 kgf/cm$^2$ or less, the shot feeling is enhanced, and the spin rate on approach shots also increases. The lower limit of the 10% elastic modulus of the cover is not limited, but is preferably more than 40 kgf/cm$^2$ (3.9 MPa), more preferably 45 kgf/cm$^2$ (4.4 MPa), and even more preferably 50 kgf/cm$^2$ (4.9 MPa).

(Hc)

The hardness of the cover is preferably 40 or more, more preferably 45 or more, and even more preferably 50 or more, and is preferably 65 or less, more preferably 60 or less, and even more preferably 55 or less in Shore D hardness. If the hardness of the cover is 40 or more in Shore D hardness, the spin rate on driver shots decreases and thus the flight distance further increases. In addition, if the hardness of the cover is 65 or less in Shore D hardness, the spin rate on approach shots also increases. The hardness of the cover is a slab hardness obtained by molding the cover composition for forming the cover into a sheet form and measuring the hardness of the sheet.

(Vc)

The proportion occupied by the volume Vc of the cover in the golf ball body is preferably 3.0 vol % or more, more preferably 3.5 vol % or more, and even more preferably 4.0 vol % or more, and is preferably less than 10 vol %, more preferably 9.0 vol % or less, and even more preferably 8.0 vol % or less. If the proportion is 3.0 vol % or more, the spin rate on approach shots increases, and if the proportion is less than 10 vol %, the spin rate on driver shots decreases and thus the flight distance increases. It is noted that the volume of the golf ball body and the volume of the cover are volumes when assuming no dimples are formed on the golf ball body and the cover.

The cover material constituting the cover is not particularly limited, and examples thereof include an ionomer resin, a polyurethane, a polyimide, a polyester, and a polystyrene. Among them, the polyurethane and the ionomer resin are preferred. In particular, the polyurethane is preferred in terms of the spin performance on approach shots and abrasion resistance.

The polyurethane may be either a thermoplastic polyurethane or a thermosetting polyurethane. The thermoplastic polyurethane is a polyurethane exhibiting plasticity by heating and generally means a polyurethane having a linear chain structure polymerized to a certain extent. On the other hand, the thermosetting polyurethane (two-component curing type polyurethane) is a polyurethane obtained by polymerization through a reaction between a low-molecular weight urethane prepolymer and a curing agent (chain extender) when forming the cover. The thermosetting polyurethane includes a polyurethane having a linear chain structure or a polyurethane having a three-dimensional crosslinked structure, depending on the number of the functional group in the prepolymer or the curing agent (chain extender) to be used. As the polyurethane, a thermoplastic elastomer is preferable.

Examples of the ionomer resin include a product obtained by neutralizing at least a part of carboxylic groups in a binary copolymer composed of an olefin and an α,β-unsaturated carboxylic acid having 3 to 8 carbon atoms with a metal ion; a product obtained by neutralizing at least a part of carboxylic groups in a ternary copolymer composed of an olefin, an α,β-unsaturated carboxylic acid having 3 to 8 carbon atoms and an α,β-unsaturated carboxylic acid ester with a metal ion; and a mixture thereof. The olefin preferably includes an olefin having 2 to 8 carbon atoms. Examples of the olefin include ethylene, propylene, butene, pentene, hexene, heptene, octane and the like. Among them, ethylene is particularly preferred. Examples of the α,β-unsaturated carboxylic acid having 3 to 8 carbon atoms include acrylic acid, methacrylic acid, fumaric acid, maleic acid, crotonic acid and the like. Among these, acrylic acid and methacrylic acid are particularly preferred. Examples of the α,β-unsaturated carboxylic acid ester include methyl ester, ethyl ester, propyl ester, n-butyl ester, and isobutyl ester of acrylic acid, methacrylic acid, fumaric acid, maleic acid and the like. Among them, acrylic acid ester and methacrylic acid ester are particularly preferable. Among these ionomer resins, a metal ion-neutralized product of a binary copolymer of ethylene-(meth)acrylic acid, and a metal ion-neutralized product of a ternary copolymer of ethylene-(meth)acrylic acid-(meth)acrylic acid ester are preferable.

Specific examples of the cover material include an ionomer resin having a trade name of "Himilan (registered trademark)" commercially available from Du Pont-Mitsui Polychemicals Co., Ltd., a thermoplastic polyurethane elastomer having a trade name of "Elastollan (registered trademark)" commercially available from BASF Japan Ltd., a thermoplastic polyamide elastomer having a trade name of "Pebax (registered trademark)" commercially available from Arkema Inc., a thermoplastic polyester elastomer having a trade name of "Hytrel (registered trademark)" commercially available from Du Pont-Toray Co., Ltd., a thermoplastic styrene elastomer having a trade name of "Rabalon (registered trademark)" or a thermoplastic polyester elastomer having a trade name of "Primalloy (registered trademark)" commercially available from Mitsubishi Chemical Corporation, and the like. These cover materials may be used solely or as a mixture of at least two of them.

In addition to the aforementioned resin component, the cover may further contain a pigment component such as a white pigment (e.g. titanium oxide), a blue pigment and a red pigment; a specific gravity adjusting agent such as calcium carbonate and barium sulfate; a dispersant; an antioxidant; an ultraviolet absorber; a light stabilizer (e.g. a hindered amine light stabilizer); a fluorescent material or a fluorescent brightener; or the like, as long as they do not impair the performance of the cover.

The embodiment of molding the cover composition into the cover is not particularly limited, and examples thereof include an embodiment of injection molding the cover composition directly onto the core; and an embodiment of molding the cover composition into hollow shells, covering the core with a plurality of the hollow shells and performing compression molding (preferably an embodiment of molding the cover composition into hollow half-shells, covering the core with two of the half-shells and performing compression molding). After the cover is molded, the golf ball body is ejected from the mold, and as necessary, the golf ball body is preferably subjected to surface treatments such as deburring, cleaning, and sandblast. If desired, a mark may be formed.

The total number of dimples formed on the cover is preferably 200 or more and 500 or less. If the total number of dimples is less than 200, the dimple effect is hardly obtained. On the other hand, if the total number of dimples exceeds 500, the dimple effect is hardly obtained because the size of the respective dimples is small. The dimple shape (shape in a plan view) includes, for example, without particular limitation, a circle; a polygonal shape such as a roughly triangular shape, a roughly quadrangular shape, a roughly pentagonal shape, and a roughly hexagonal shape; and another irregular shape. The dimple shape may be employed solely, or at least two of the shapes may be used in combination.

In the present invention, the ratio of the total area of the dimples to the surface area of a phantom sphere is referred to as an occupation ratio. The phantom sphere is a golf ball (spherical body) assumed that no dimples are present thereon. In the golf ball of the present invention, the occupation ratio of the dimples is preferably 60% or more, more preferably 63% or more, and even more preferably 66% or more, and is preferably 90% or less, more preferably 87% or less, and even more preferably 84% or less. If the occupation ratio is too high, the contribution of the paint film to the coefficient of friction becomes small. Further, if the occupation ratio is too low, the flight performance is lowered.

It is noted that the area of the dimple refers to an area enclosed in the periphery of the dimple when observing the central point of the golf ball from infinity. In case of a circular dimple, the area S of the dimple is calculated according to the following mathematical formula.

$$S=(Di/2)^2 \cdot \pi \text{ (Di:diameter of the dimple)}$$

[Reinforcing Layer]

The golf ball body may further comprise a reinforcing layer between the intermediate layer and the cover. The reinforcing layer adheres to the intermediate layer as well as the cover firmly. The reinforcing layer suppresses the delamination of the cover from the intermediate layer. In particular, if the golf ball having a thin cover is hit with the edge of the club face, wrinkles tend to occur. The reinforcing layer suppresses the wrinkles.

The reinforcing layer is formed from a reinforcing layer composition containing a resin component. As the resin component, a two-component curing type thermosetting resin is suitably used. Specific examples of the two-component curing type thermosetting resin include an epoxy resin, a urethane resin, an acrylic resin, a polyester resin, and a cellulose resin. From the aspect of the strength and durability of the reinforcing layer, the two-component curing type epoxy resin and the two-component curing type urethane resin are preferable.

The reinforcing layer composition may further contain an additive such as a coloring material (e.g. titanium dioxide), a phosphoric acid based stabilizer, an antioxidant, a light stabilizer, a fluorescent brightener, an ultraviolet absorber, and an anti-blocking agent. The additive may be added into either the base agent or the curing agent of the two-component curing type thermosetting resin.

The golf ball body preferably has a diameter in a range from 40 mm to 45 mm. In light of satisfying a regulation of US Golf Association (USGA), the diameter is preferably 42.67 mm or more. In light of prevention of the air resistance, the diameter is preferably 44 mm or less, and more preferably 42.80 mm or less. The golf ball preferably has a mass of 40 g or more and 50 g or less. In light of obtaining greater inertia, the mass is preferably 44 g or more, and more preferably 45 g or more. In light of satisfying a regulation of USGA, the mass is preferably 45.93 g or less.

When the golf ball of the present invention has a diameter in a range from 40 mm to 45 mm, the compression deformation amount (shrinking amount along the compression direction) of the golf ball when applying a load from 98 N as an initial load to 1275 N as a final load to the golf ball is preferably 2.0 mm or more, more preferably 2.1 mm or more, even more preferably 2.2 mm or more, and most preferably 2.3 mm or more, and is preferably 4.0 mm or less, more preferably 3.7 mm or less. If the compression deformation amount is 2.0 mm or more, the golf ball does not become excessively hard, and thus the shot feeling thereof is better. On the other hand, if the compression deformation amount is 4.0 mm or less, the resilience is enhanced.

Examples of the construction of the golf ball body include a four-piece golf ball comprising a single-layered core, an inner intermediate layer covering the single-layered core, an outer intermediate layer covering the inner intermediate layer, and a cover covering the outer intermediate layer; and a five-piece golf ball comprising a dual-layered core, an inner intermediate layer covering the dual-layered core, an outer intermediate layer covering the inner intermediate layer, and a cover covering the outer intermediate layer.

The FIGURE is a partially cutaway cross-sectional view showing a golf ball 1 according to one embodiment of the present invention. The golf ball 1 comprises a spherical core 2 consisting of a spherical inner core 21 and an outer core 22 disposed outside the inner core 21, an inner intermediate layer 3 disposed outside the spherical core 2, an outer intermediate layer 4 disposed outside the inner intermediate layer 3, a reinforcing layer 5 disposed outside the outer intermediate layer 4, a cover 6 disposed outside the reinforcing layer 5, and a paint film 7 formed on a surface of the cover 6. A plurality of dimples 61 are formed on the surface of the cover 6. Other portions than the dimples 61 on the surface of the cover 6 are land 62.

EXAMPLES

Hereinafter, the present invention will be described in detail by way of examples. However, the present invention is not limited to the examples described below, and various changes and modifications can be made without departing from the spirit and scope of the present invention.

[Evaluation Method]
(1) Slab Hardness (Shore D Hardness)

A sheet with a thickness of about 2 mm was produced by injection molding the cover composition or the intermediate layer composition, and stored at 23° C. for two weeks. Three or more of the sheets were stacked on one another so as not to be affected by the measuring substrate on which the sheets were placed, and the hardness of the stack was measured with an automatic hardness tester Digitest II manufactured by H. Barleys Company, provided with a Shore D type spring hardness tester prescribed in ASTM-D2240.

(2) Core Hardness (Shore C Hardness)

An automatic hardness tester Digitest II manufactured by H. Barleys Company was used to measure the hardness of the core. The Shore C hardness measured at the core surface was adopted as the surface hardness of the core. In addition, the core was cut into two semispheres to obtain a cut plane, and the Shore C hardness measured at the central point of the cut plane was adopted as the center hardness of the core.

(3) Compression Deformation Amount (mm)

The compression deformation amount of the golf ball along the compression direction (shrinking amount of the golf ball along the compression direction) when applying a load from 98 N as an initial load to 1275 N as a final load to the golf ball was measured.

(4) Mechanical Properties of Cover, Inner Intermediate Layer and Outer Intermediate Layer A sheet with a thickness of about 2 mm was prepared by injection molding the cover composition or the intermediate layer composition, and stored at 23° C. for two weeks. In accordance with ISO 527-1, a dumbbell shape test piece (distance between marked lines: 73 mm, width of parallel part: 5.0 mm) was prepared from the sheet, the mechanical properties of the test piece were measured with a tensile tester (tension speed: 100 mm/min, measurement temperature: 23° C.) manufactured by Shimadzu Corporation, and the modulus (tension elastic modulus) at 10% elongation was calculated.

(5) Mechanical Properties of Paint Film

A paint obtained by blending the base agent and the curing agent was dried and cured at 40° C. for 4 hours to prepare a paint film. In accordance with JIS-K7161, the paint film was punched into a dumbbell shape (distance between marked lines: 20 mm, width of parallel part: 10 mm) to prepare a test piece, the mechanical properties of the test piece were measured with a tensile tester manufactured by Shimadzu Corporation, and the modulus (tension elastic modulus) at 10% elongation was calculated.

Thickness of test piece: 0.05 mm
Tension speed: 50 mm/min
Measurement temperature: 23° C.

(6) Coefficient of Restitution

A 198.4 g of metal cylindrical object was allowed to collide with each golf ball at a speed of 45 m/sec, and the speeds of the cylindrical object and the golf ball before and after the collision were measured. Based on these speeds and the mass of each object, the coefficient of restitution for each golf ball was calculated. The measurement was conducted using twelve samples for each golf ball, and the average value of the twelve samples was adopted as the coefficient of restitution for the golf ball. It is noted that the coefficient of restitution of the golf ball No. 1 was defined as an index of 100, and the coefficient of restitution of each golf ball is represented by converting the coefficient of restitution of each golf ball into this index.

(7) Flight Distance (m) and Spin Rate (rpm) on Driver Shots

A driver provided with a titanium head (XXIO, Shaft: S, loft: 10.0°, manufactured by Dunlop Sports Limited) was installed on a swing machine manufactured by True Temper Sports, Inc. The golf ball was hit at a head speed of 45 m/sec, and the spin rate immediately after hitting the golf ball, and the flight distance (distance from the launch point to the stop point) were measured. The measurement was conducted ten times for each golf ball, and the average value thereof was adopted as the measurement value for the golf ball. It is noted that a sequence of photographs of the hit golf ball were taken for measuring the spin rate immediately after hitting the golf ball.

(8) Spin Rate on Approach Shots

A sand wedge (CG15 forged wedge (58°) manufactured by Cleveland Golf) was installed on a swing machine manufactured by True Temper Sports, Inc. The golf ball was hit at a head speed of 10 m/sec, and the spin rate (rpm) was measured by taking a sequence of photographs of the hit golf ball. The measurement was conducted ten times for each golf ball, and the average value thereof was used as the spin rate.

(9) Shot Feeling

An actual hitting test was carried out by ten amateur golfers (high skilled persons) using a sand wedge (CG 15 forged wedge (58°) manufactured by Cleveland Golf). In accordance with the number of the people who answered the feeling was good (feeling like that the golf ball was lifted on the club face, feeling like that the golf ball gripped on the club surface, feeling like that the spin was imparted, feeling like that the golf ball was stuck on the club face, etc.), the golf ball was evaluated as follows.

E (excellent): 8 or more
G (good): 4 to 7
P (poor): 3 or less

(10) Stain Resistance

The golf ball was immersed for 30 seconds in an aqueous solution of tincture of iodine obtained by diluting a tincture of iodine (an ethanol solution containing 6 mass % of iodine and 4 mass % of potassium iodide) to 40 times, and then taken out. After the extra aqueous solution of tincture of iodine adhered on the surface of the golf ball was wipe off, color tones (L, a, b) of the golf ball before and after the immersion were measured using a color difference meter (CM3500D manufactured by Konica Minolta Inc.), and the color difference ($\Delta E$) was calculated according to the following equation. A larger color difference value ($\Delta E$) means a larger color change extent.

$$\Delta E = [(\Delta L)^2 + (\Delta a)^2 + (\Delta b)^2]^{1/2}$$

Evaluation Standard
E (excellent): $\Delta E$ is 15 or less
G (good): $\Delta E$ is more than 15 and 20 or less
F (fair): $\Delta E$ is more than 20 and less than 25
P (poor): $\Delta E$ is 25 or more

[Production of Golf Ball]

1. Production of Core

The rubber compositions having formulations shown in Table 1 were heat-molded in upper and lower molds having a semispherical cavity, at the conditions shown in Table 2, to obtain inner cores. Next, the rubber compositions having formulations shown in Table 1 were kneaded, and molded into half shells in a mold for forming half shells. The above-obtained inner cores were covered with two of the half shells concentrically. The inner core and two of the half shells were heat-pressed in upper and lower molds having a semispherical cavity, at the conditions shown in Table 2, to obtain a spherical core. It is noted that the amount of barium sulfate was adjusted such that the finally obtained golf ball had a mass of 45.6 g.

TABLE 1

| Rubber composition No. | | a | b | c | d | e |
|---|---|---|---|---|---|---|
| Formulation (parts by mass) | Polybutadiene rubber | 100 | 100 | 100 | 100 | 100 |
| | Zinc acrylate | 23 | 32 | 33 | 34 | 30 |
| | Zinc oxide | 5 | 5 | 5 | 5 | 5 |
| | Barium sulfate | *1) | *1) | *1) | *1) | *1) |
| | 2-Thionaphthol | 0.2 | 0.2 | 0.2 | 0.2 | 0.2 |
| | Dicumyl peroxide | 0.8 | 0.8 | 0.8 | 0.8 | 0.8 |
| | Zinc octylate | 2 | 2 | 2 | 2 | — |

*1) The amount of barium sulfate was adjusted such that the finally obtained golf ball had a mass of 45.6 g.

Polybutadiene rubber: "BR730 (high cis-polybutadiene)" manufactured by JSR Corporation Zinc acrylate: "Sanceler (registered trademark) SR" (product of 10 mass % stearic acid coating)" manufactured by Sanshin Chemical Industry Co., Ltd.

Zinc oxide: "Ginrei R" manufactured by Toho Zinc Co., Ltd.

Barium sulfate: "Barium Sulfate BD" manufactured by Sakai Chemical Industry Co., Ltd.

2-Thionaphthol: manufactured by Tokyo Chemical Industry Co., Ltd.

Dicumyl peroxide: "Percumyl (register trademark) D" manufactured by NOF Corporation Zinc octylate: manufactured by Mitsuwa Chemicals Co., Ltd.

TABLE 2

| Core No. | | I | II | III | IV | V |
|---|---|---|---|---|---|---|
| Inner layer | Rubber composition No. | a | a | a | a | a |
| | Heating conditions Temperature (° C.) | 150 | 150 | 150 | 150 | 150 |
| | Time (min) | 20 | 20 | 20 | 20 | 20 |
| | Diameter (mm) | 15 | 15 | 15 | 15 | 15 |
| Outer layer | Rubber composition No. | b | c | d | b | e |
| | Heating conditions Temperature (° C.) | 150 | 150 | 150 | 150 | 150 |
| | Time (min) | 20 | 20 | 20 | 20 | 20 |
| | Diameter (mm) | 38.5 | 38.5 | 37.5 | 38.1 | 38.5 |
| | Center hardness (Shore C) | 55 | 55 | 55 | 55 | 55 |
| | Surface hardness (Shore C) | 86 | 85 | 90 | 86 | 83 |
| | Hardness difference (surface-center) (Shore C) | 31 | 30 | 35 | 31 | 28 |

2. Preparation of Intermediate Layer Composition and Cover Composition

The materials having formulations shown in Table 3, 4 were mixed with a twin-screw kneading extruder to obtain intermediate layer compositions and cover compositions in a pellet form. Extruding conditions are as follows: screw diameter =45 mm, screw revolution=200 rpm, and screw L/D=35. The blended material was heated to 160° C. to 230° C. at the die position of the extruder.

TABLE 3

| Intermediate layer composition No. | a | b | c | d | e | f | g | h | i | j | k | l |
|---|---|---|---|---|---|---|---|---|---|---|---|---|
| Surlyn 8150 | 50 | 50 | 32.5 | — | — | 50 | — | — | — | — | — | — |
| Surlyn 9150 | — | 50 | 32.5 | — | — | 50 | — | — | — | — | — | — |
| Polyamide 6 | — | — | 35 | — | — | — | — | — | — | — | — | — |
| Himilan AM7337 | — | — | — | 55 | 31.5 | — | 55 | 30 | 48 | 46 | 20.5 | 20 |
| Himilan AM7329 | 50 | — | — | 45 | 38.5 | — | 42 | 30 | 30 | 30 | 20 | 27 |
| Nucrel N1050H | — | — | — | — | 16 | 16 | 16 | 16 | 16 | 16 | 14 | 16 |
| Rabalon T3221C | — | — | — | — | 14 | — | — | 24 | 6 | 8 | 45.5 | 37 |
| Titanium dioxide | 3 | 3 | 3 | 3 | 3 | 3 | 3 | 3 | 3 | 3 | 5.8 | 4 |
| Slab hardness (Shore D) | 68 | 70 | 72 | 65 | 55 | 64 | 62 | 48 | 59 | 58 | 32 | 40 |
| 10% elastic modulus (kgf/cm$^2$) | 202 | 227 | 308 | 176 | 108 | 165 | 148 | 80 | 135 | 129 | 50 | 60 |

Surlyn 8150: Sodium ion-neutralized ethylene-methacrylic acid copolymer ionomer resin manufactured by E. I. du Pont de Nemours and Company
Surlyn 9150: Zinc ion-neutralized ethylene-methacrylic acid copolymer ionomer resin manufactured by E. I. du Pont de Nemours and Company
Polyamide 6: manufactured by Toray Industries, Inc.
Himilan AM7337: Sodium ion-neutralized ethylene-methacrylic acid copolymer ionomer resin manufactured by Du Pont-Mitsui Polychemicals Co., Ltd.
Himilan AM7329: Zinc ion-neutralized ethylene-methacrylic acid copolymer ionomer resin manufactured by Du Pont-Mitsui Polychemicals Co., Ltd.
Nucrel N1050H: Ethylene-methacrylic acid copolymer manufactured by Du Pont-Mitsui Polychemicals Co., Ltd.
Rabalon T3221C: Styrene elastomer manufactured by Mitsubishi Chemical Corporation

TABLE 4

| Cover composition No. | A | B | C | D | E | F | G | H | I | J |
|---|---|---|---|---|---|---|---|---|---|---|
| Elastollan NY75A | 100 | — | — | — | — | — | — | — | — | — |
| Elastollan NY82A | — | 100 | — | — | — | — | — | — | — | — |
| Elastollan NY88A | — | — | 100 | — | — | 15 | 20 | 35 | 38 | 40 |
| Elastollan NY95A | — | — | — | 100 | — | 85 | 80 | 65 | 62 | 60 |
| Elastollan NY54D | — | — | — | — | 100 | — | — | — | — | — |
| Tinuvin 770 | 0.2 | 0.2 | 0.2 | 0.2 | 0.2 | 0.2 | 0.2 | 0.2 | 0.2 | 0.2 |
| Titanium dioxide | 4 | 4 | 4 | 4 | 4 | 4 | 4 | 4 | 4 | 4 |
| Ultramarine blue | 0.04 | 0.04 | 0.04 | 0.04 | 0.04 | 0.04 | 0.04 | 0.04 | 0.04 | 0.04 |
| Slab hardness (Shore D) | 10 | 29 | 36 | 50 | 54 | 48 | 47 | 44 | 43 | 42 |
| 10% elastic modulus (kgf/cm$^2$) | 8.7 | 11 | 18 | 55 | 70 | 49 | 45 | 38 | 35 | 32 |

Elastollan NY75A: Thermoplastic polyurethane elastomer manufactured by BASF Japan Ltd.
Elastollan NY82A: Thermoplastic polyurethane elastomer manufactured by BASF Japan Ltd.
Elastollan NY88A: Thermoplastic polyurethane elastomer manufactured by BASF Japan Ltd.
Elastollan NY95A: Thermoplastic polyurethane elastomer manufactured by BASF Japan Ltd.
Elastollan NY54D: Thermoplastic polyurethane elastomer manufactured by BASF Japan Ltd.
Tinuvin 770: Hindered amine light stabilizer manufactured by BASF Japan Ltd.

3. Molding of Intermediate Layer

The above-obtained intermediate layer compositions were injection molded on the above-obtained spherical cores directly to form inner intermediate layers covering the spherical cores. Further, the above-obtained intermediate layer compositions were injection molded on the inner intermediate layers directly to form outer intermediate layers covering the inner intermediate layers. Upper and lower molds for molding have a semispherical cavity and a retractable hold pin for holding the spherical body. When molding the intermediate layer, the hold pin was protruded to hold the spherical core or the spherical core having the inner intermediate layer formed thereon, the intermediate layer compositions were charged into the mold and cooled, and the spherical bodies were ejected from the mold.

4. Formation of Reinforcing Layer

A reinforcing layer composition (trade name "Polyn 750LE" manufactured by Shinto Paint Co., Ltd.) containing a two-component curing type epoxy resin as a base resin was prepared. The base agent contains 30 parts by mass of a bisphenol A type epoxy resin and 70 parts by mass of a solvent. The curing agent contains 40 parts by mass of a modified polyamide amine, 5 parts by mass of titanium oxide and 55 parts by mass of a solvent. The mass ratio of the base agent to the curing agent was set to 1/1. The reinforcing layer composition was applied with an air gun to the surface of the spherical body having the intermediate layer covered thereon, and kept at the atmosphere of 23° C. for 12 hours to form a reinforcing layer. The thickness of the reinforcing layer was 7 μm.

5. Molding of Cover

The cover composition in a pellet form was charged one by one into each concave portion of the lower mold of a mold for molding half shells, and compressed to mold half shells. Compression molding was conducted at the molding temperature of 170° C. for 5 minutes under the molding pressure of 2.94 MPa. The spherical body having the intermediate layer covered and the reinforcing layer formed thereon was covered with two of the half shells concentrically. The spherical body and half shells were charged into a final mold provided with a plurality of pimples on the cavity surface thereof, and compression molded to form a cover. Compression molding was conducted at the molding temperature of 145° C. for 2 minutes under the molding pressure of 9.8 MPa. A plurality of dimples having a shape which is the reversed shape of the pimples were formed on the cover.

6. Preparation of Paint
Preparation of Base Agent

As a polyol component, polytetramethylene ether glycol (PTMG) and trimethylolpropane (TMP) were dissolved in a solvent (toluene and methyl ethyl ketone). Then, dibutyl tin laurate, as a catalyst, was added therein in an amount of 0.1 mass % with respect to the total amount of the base agent. While keeping the temperature of the obtained polyol solution at 80° C., isophorone diisocyanate (IPDI), as a polyisocyanate component, was added dropwise to the polyol solution and mixed. After finishing the adding of isophorone diisocyanate, stirring was continued until the isocyanate group no longer existed. Then, the reaction liquid was cooled at the room temperature to prepare a urethane polyol (solid content: 30 mass %). The formulations of each urethane polyol are shown in Table 5.

TABLE 5

| | Urethane polyol No. | | | | |
|---|---|---|---|---|---|
| | 1 | 2 | 3 | 4 | 5 |
| Polyol component | PTMG TMP | PTMG TMP | PTMG TMP | PTMG TMP | PTMG TMP |
| Polyisocyanate component | IPDI | IPDI | IPDI | IPDI | IPDI |
| Number average molecular weight of PTMG | 650 | 800 | 1000 | 1500 | 2000 |
| TMP:PTMG (molar ratio) | 1.8:1.0 | 1.8:1.0 | 1.8:1.0 | 1.8:1.0 | 1.8:1.0 |
| Molar ratio (NCO/OH) of NCO group of polyisocyanate component to OH group of polyol component | 0.6 | 0.6 | 0.6 | 0.6 | 0.6 |
| Content of PTMG (mass %) | 67 | 71 | 76 | 82 | 86 |
| Hydroxyl value of solid component (mgKOH/g) | 67.4 | 58.3 | 49.5 | 35.9 | 28.2 |
| Weight average molecular weight | 4867 | 5620 | 6624 | 9135 | 11646 |

Preparation of Curing Agent 30 parts by mass of the isocyanurate-modified product of hexamethylene diisocyanate (Duranate (registered trademark) TKA-100 (NCO content: 21.7 mass %) manufactured by Asahi Kasei Chemicals Corporation), 30 parts by mass of the biuret-modified product of hexamethylene diisocyanate (Duranate 21 S-75E (NCO content: 15.5 mass %) manufactured by Asahi Kasei Chemicals Corporation), and 40 parts by mass of the isocyanurate-modified product of isophorone diisocyanate (Desmodur (registered trademark) Z 4470 (NCO content: 11.9 mass %) manufactured by Bayer company) were mixed. As the solvent, a mixed solvent of methyl ethyl ketone, n-butyl acetate and toluene was added therein to adjust the concentration of the polyisocyanate component to 60 mass %.

Preparation of Paint

The curing agent was blended into the above-prepared base agent in a NCO/OH ratio shown in Tables 6 to 9, to prepare a paint.

7. Formation of Paint Film

The surface of the above-obtained golf ball body was treated with sandblast and marked. The paint was applied to the golf ball body with an air gun, and then dried for 24 hours in an oven at 40° C. to obtain a golf ball having a diameter of 42.7 mm and a mass of 45.6 g. The thickness of the paint film was 20 μm. The application of the paint was conducted as follows. The golf ball body was placed in a rotating member provided with prongs, and the rotating member was allowed to rotate at 300 rpm. The application of the paint was conducted by spacing a spray distance (7 cm) between the air gun and the golf ball body, and moving the air gun in an up and down direction. The painting interval in the overpainting operation was set to 1.0 second. The application of the paint was conducted under the spraying conditions of overpainting operation, twice, spraying air pressure: 0.15 MPa, compressed air tank pressure: 0.10 MPa, painting time per one application: one second, atmosphere temperature: 20° C. to 27° C., and atmosphere humidity: 65% or less.

Evaluation results of the obtained golf balls are shown in Tables 6 to 9.

TABLE 6

| | Golf ball No. | 1 | 2 | 3 | 4 | 5 | 6 |
|---|---|---|---|---|---|---|---|
| Core | No. | I | I | I | I | II | I |
| | Diameter (mm) | 38.5 | 38.5 | 38.5 | 38.5 | 38.5 | 38.5 |
| | Center hardness (Shore C) | 55 | 55 | 55 | 55 | 55 | 55 |
| | Surface hardness (Shore C) | 86 | 86 | 86 | 86 | 85 | 86 |
| | Hardness difference (Shore C) | 31 | 31 | 31 | 31 | 30 | 31 |
| Inner intermediate layer | Intermediate layer composition No. | a | b | c | d | e | a |
| | 10% elastic modulus Minm (kgf/cm$^2$) | 202 | 227 | 308 | 176 | 108 | 202 |
| | Thickness Tinm (mm) | 1.0 | 1.0 | 1.0 | 1.0 | 1.0 | 1.0 |
| | Volume proportion of Vinm (vol %) | 12.0 | 12.0 | 12.0 | 12.0 | 12.0 | 12.0 |
| Outer intermediate layer | Intermediate layer composition No. | k | k | k | k | k | l |
| | 10% elastic modulus Moum (kgf/cm$^2$) | 50 | 50 | 50 | 50 | 50 | 60 |
| | Thickness Toum (mm) | 0.8 | 0.8 | 0.8 | 0.8 | 0.8 | 0.8 |
| | Volume proportion of Voum (vol %) | 10.5 | 10.5 | 10.5 | 10.5 | 10.5 | 10.5 |
| Cover | Cover composition No. | D | D | D | D | D | E |
| | 10% elastic modulus Mc (kgf/cm$^2$) | 55 | 55 | 55 | 55 | 55 | 70 |
| | Thickness Tc (mm) | 0.3 | 0.3 | 0.3 | 0.3 | 0.3 | 0.3 |
| | Volume proportion of Vc (vol %) | 4.2 | 4.2 | 4.2 | 4.2 | 4.2 | 4.2 |
| Paint | Base agent Urethane polyol No. | 3 | 3 | 3 | 3 | 3 | 3 |
| | Number average molecular weight of PTMG | 1000 | 1000 | 1000 | 1000 | 1000 | 1000 |
| | Curing agent/base agent (NCO/OH molar ratio) | 0.85 | 0.85 | 0.85 | 0.85 | 0.85 | 0.85 |
| Paint film | 10% elastic modulus Mp (kgf/cm$^2$) | 50 | 50 | 50 | 50 | 50 | 50 |
| | Thickness Tp (mm) | 0.02 | 0.02 | 0.02 | 0.02 | 0.02 | 0.02 |
| | 200 × [NCO/OH] − 75 | 95 | 95 | 95 | 95 | 95 | 95 |
| | Absolute value of difference (|Mp − Mc|) (kgf/cm$^2$) | 5 | 5 | 5 | 5 | 5 | 20 |
| | Difference (Minm − Moum) (kgf/cm$^2$) | 152 | 177 | 258 | 126 | 58 | 142 |
| | Difference (Moum − Mc) (kgf/cm$^2$) | −5 | −5 | −5 | −5 | −5 | −10 |
| | (Tinm × Minm)/(Toum × Moum) | 5.1 | 5.7 | 7.7 | 4.4 | 2.7 | 4.2 |
| | (Toum × Moum)/(Tc × Mc) | 2.4 | 2.4 | 2.4 | 2.4 | 2.4 | 2.3 |
| | (Tc × Mc)/(Tp × Mp) | 16.5 | 16.5 | 16.5 | 16.5 | 16.5 | 21.0 |
| Evaluation | Compression deformation amount (mm) | 2.4 | 2.4 | 2.4 | 2.4 | 2.4 | 2.4 |
| | Coefficient of restitution | 100 | 102 | 104 | 98 | 96 | 101 |
| | Spin rate on driver shots (rpm) | 2650 | 2600 | 2550 | 2700 | 2750 | 2600 |
| | Flight distance on driver shots (m) | 252 | 252 | 254 | 250 | 248 | 251 |
| | Spin rate on approach shots (rpm) | 3700 | 3650 | 3600 | 3550 | 3500 | 3650 |
| | Shot feeling | G | G | G | G | G | G |
| | Stain resistance | G | G | G | G | G | G |

TABLE 7

| | Golf ball No. | 7 | 8 | 9 | 10 | 11 | 12 |
|---|---|---|---|---|---|---|---|
| Core | No. | I | I | I | I | I | I |
| | Diameter (mm) | 38.5 | 38.5 | 38.5 | 38.5 | 38.5 | 38.5 |
| | Center hardness (Shore C) | 55 | 55 | 55 | 55 | 55 | 55 |
| | Surface hardness (Shore C) | 86 | 86 | 86 | 86 | 86 | 86 |
| | Hardness difference (Shore C) | 31 | 31 | 31 | 31 | 31 | 31 |
| Inner intermediate layer | Intermediate layer composition No. | a | a | a | a | k | e |
| | 10% elastic modulus Minm (kgf/cm$^2$) | 202 | 202 | 202 | 202 | 50 | 108 |
| | Thickness Tinm (mm) | 1.0 | 1.0 | 1.0 | 1.0 | 1.0 | 1.0 |
| | Volume proportion of Vinm (vol %) | 12.0 | 12.0 | 12.0 | 12.0 | 12.0 | 12.0 |
| Outer intermediate layer | Intermediate layer composition No. | k | k | k | k | a | f |
| | 10% elastic modulus Moum (kgf/cm$^2$) | 50 | 50 | 50 | 50 | 202 | 165 |
| | Thickness Toum (mm) | 0.8 | 0.8 | 0.8 | 0.8 | 0.8 | 0.8 |
| | Volume proportion of Voum (vol %) | 10.5 | 10.5 | 10.5 | 10.5 | 10.5 | 10.5 |
| Cover | Cover composition No. | A | C | J | G | D | D |
| | 10% elastic modulus Mc (kgf/cm$^2$) | 8.7 | 18 | 32 | 45 | 55 | 55 |
| | Thickness Tc (mm) | 0.3 | 0.3 | 0.3 | 0.3 | 0.3 | 0.3 |
| | Volume proportion of Vc (vol %) | 4.2 | 4.2 | 4.2 | 4.2 | 4.2 | 4.2 |
| Paint | Base agent Urethane polyol No. | 3 | 3 | 3 | 3 | 3 | 3 |
| | Number average molecular weight of PTMG | 1000 | 1000 | 1000 | 1000 | 1000 | 1000 |
| | Curing agent/base agent (NCO/OH molar ratio) | 0.85 | 0.85 | 0.85 | 0.85 | 0.85 | 0.85 |
| Paint film | 10% elastic modulus Mp (kgf/cm$^2$) | 50 | 50 | 50 | 50 | 50 | 50 |
| | Thickness Tp (mm) | 0.02 | 0.02 | 0.02 | 0.02 | 0.02 | 0.02 |
| | 200 × [NCO/OH] − 75 | 95 | 95 | 95 | 95 | 95 | 95 |
| | Absolute value of difference (|Mp − Mc|) (kgf/cm$^2$) | 41 | 32 | 18 | 5 | 5 | 5 |
| | Difference (Minm − Moum) (kgf/cm$^2$) | 152 | 152 | 152 | 152 | −152 | −57 |
| | Difference (Moum − Mc) (kgf/cm$^2$) | 41 | 32 | 18 | 5 | 147 | 110 |
| | (Tinm × Minm)/(Toum × Moum) | 5.1 | 5.1 | 5.1 | 5.1 | 0.3 | 0.8 |
| | (Toum × Moum)/(Tc × Mc) | 15.3 | 7.4 | 4.2 | 3.0 | 9.8 | 8.0 |
| | (Tc × Mc)/(Tp × Mp) | 2.6 | 5.4 | 9.6 | 13.5 | 16.5 | 16.5 |
| Evaluation | Compression deformation amount (mm) | 2.4 | 2.4 | 2.4 | 2.4 | 2.4 | 2.4 |
| | Coefficient of restitution | 94 | 95 | 95 | 96 | 101 | 102 |
| | Spin rate on driver shots (rpm) | 2950 | 2900 | 2850 | 2800 | 2600 | 2550 |
| | Flight distance on driver shots (m) | 240 | 242 | 244 | 246 | 254 | 255 |
| | Spin rate on approach shots (rpm) | 3900 | 3850 | 3800 | 3750 | 3550 | 3400 |
| | Shot feeling | G | G | G | G | F | F |
| | Stain resistance | G | G | G | G | G | G |

TABLE 8

| | Golf ball No. | 13 | 14 | 15 | 16 | 17 | 18 |
|---|---|---|---|---|---|---|---|
| Core | No. | III | I | IV | V | I | I |
| | Diameter (mm) | 37.5 | 38.5 | 38.1 | 38.5 | 38.5 | 38.5 |
| | Center hardness (Shore C) | 55 | 55 | 55 | 55 | 55 | 55 |
| | Surface hardness (Shore C) | 90 | 86 | 86 | 83 | 86 | 86 |
| | Hardness difference (Shore C) | 35 | 31 | 31 | 28 | 31 | 31 |
| Inner intermediate layer | Intermediate layer composition No. | a | a | a | a | a | a |
| | 10% elastic modulus Minm (kgf/cm$^2$) | 202 | 202 | 202 | 202 | 202 | 202 |
| | Thickness Tinm (mm) | 0.8 | 0.8 | 1.0 | 1.0 | 1.0 | 1.0 |
| | Volume proportion of Vinm (vol %) | 9.0 | 9.5 | 11.8 | 12.0 | 12.0 | 12.0 |
| Outer intermediate layer | Intermediate layer composition No. | k | k | k | k | k | k |
| | 10% elastic modulus Moum (kgf/cm$^2$) | 50 | 50 | 50 | 50 | 50 | 50 |
| | Thickness Toum (mm) | 0.8 | 1.0 | 0.8 | 0.8 | 0.8 | 0.8 |
| | Volume proportion of Voum (vol %) | 9.8 | 13.0 | 10.3 | 10.5 | 10.5 | 10.5 |
| Cover | Cover composition No. | D | D | D | D | D | D |
| | 10% elastic modulus Mc (kgf/cm$^2$) | 55 | 55 | 55 | 55 | 55 | 55 |
| | Thickness Tc (mm) | 1.0 | 0.3 | 0.5 | 0.3 | 0.3 | 0.3 |
| | Volume proportion of Vc (vol %) | 13.4 | 4.2 | 6.9 | 4.2 | 4.2 | 4.2 |
| Paint | Base agent Urethane polyol No. | 3 | 3 | 3 | 3 | 3 | 3 |
| | Number average molecular weight of PTMG | 1000 | 1000 | 1000 | 1000 | 1000 | 1000 |
| | Curing agent/base agent (NCO/OH molar ratio) | 0.85 | 0.85 | 0.85 | 0.85 | 1.23 | 1.39 |
| Paint film | 10% elastic modulus Mp (kgf/cm$^2$) | 50 | 50 | 50 | 50 | 100 | 122 |
| | Thickness Tp (mm) | 0.02 | 0.02 | 0.02 | 0.02 | 0.02 | 0.02 |
| | 200 × [NCO/OH] − 75 | 95 | 95 | 95 | 95 | 171 | 203 |
| | Absolute value of difference (|Mp − Mc|) (kgf/cm$^2$) | 5 | 5 | 5 | 5 | 45 | 67 |
| | Difference (Minm − Moum) (kgf/cm$^2$) | 152 | 152 | 152 | 152 | 152 | 152 |

TABLE 8-continued

|  |  | Golf ball No. | 13 | 14 | 15 | 16 | 17 | 18 |
|---|---|---|---|---|---|---|---|---|
|  |  | Difference (Moum − Mc) (kgf/cm$^2$) | −5 | −5 | −5 | −5 | −5 | −5 |
|  |  | (Tinm × Minm)/(Toum × Moum) | 4.0 | 3.2 | 5.1 | 5.1 | 5.1 | 5.1 |
|  |  | (Toum × Moum)/(Tc × Mc) | 0.7 | 3.0 | 1.5 | 2.4 | 2.4 | 2.4 |
|  |  | (Tc × Mc)/(Tp × Mp) | 55.0 | 16.5 | 27.5 | 16.5 | 8.3 | 6.8 |
| Evaluation |  | Compression deformation amount (mm) | 2.5 | 2.4 | 2.4 | 2.4 | 2.4 | 2.4 |
|  |  | Coefficient of restitution | 96 | 96 | 98 | 99 | 100 | 100 |
|  |  | Spin rate on driver shots (rpm) | 2800 | 2800 | 2700 | 2700 | 2650 | 2650 |
|  |  | Flight distance on driver shots (m) | 246 | 246 | 250 | 251 | 252 | 252 |
|  |  | Spin rate on approach shots (rpm) | 4100 | 3800 | 3900 | 3700 | 3450 | 3400 |
|  |  | Shot feeling | G | G | G | G | F | F |
|  |  | Stain resistance | G | G | G | G | G | G |

TABLE 9

|  |  | Golf ball No. | 19 | 20 | 21 | 22 | 23 | 24 | 25 |
|---|---|---|---|---|---|---|---|---|---|
| Core |  | No. | I | I | I | I | I | I | I |
|  |  | Diameter (mm) | 38.5 | 38.5 | 38.5 | 38.5 | 38.5 | 38.5 | 38.5 |
|  |  | Center hardness (Shore C) | 55 | 55 | 55 | 55 | 55 | 55 | 55 |
|  |  | Surface hardness (Shore C) | 86 | 86 | 86 | 86 | 86 | 86 | 86 |
|  |  | Hardness difference (Shore C) | 31 | 31 | 31 | 31 | 31 | 31 | 31 |
| Inner intermediate layer |  | Intermediate layer composition No. | a | a | a | a | a | a | a |
|  |  | 10% elastic modulus Minm (kgf/cm$^2$) | 202 | 202 | 202 | 202 | 202 | 202 | 202 |
|  |  | Thickness Tinm (mm) | 1.0 | 1.0 | 1.0 | 1.0 | 1.0 | 1.0 | 1.0 |
|  |  | Volume proportion of Vinm (vol %) | 12.0 | 12.0 | 12.0 | 12.0 | 12.0 | 12.0 | 12.0 |
| Outer intermediate layer |  | Intermediate layer composition No. | k | k | k | k | k | k | k |
|  |  | 10% elastic modulus Moum (kgf/cm$^2$) | 50 | 50 | 50 | 50 | 50 | 50 | 50 |
|  |  | Thickness Toum (mm) | 0.8 | 0.8 | 0.8 | 0.8 | 0.8 | 0.8 | 0.8 |
|  |  | Volume proportion of Voum (vol %) | 10.5 | 10.5 | 10.5 | 10.5 | 10.5 | 10.5 | 10.5 |
| Cover |  | Cover composition No. | D | D | D | D | D | D | e |
|  |  | 10% elastic modulus Mc (kgf/cm$^2$) | 55 | 55 | 55 | 55 | 55 | 55 | 108 |
|  |  | Thickness Tc (mm) | 0.3 | 0.3 | 0.3 | 0.3 | 0.3 | 0.3 | 0.3 |
|  |  | Volume proportion of Vc (vol %) | 4.2 | 4.2 | 4.2 | 4.2 | 4.2 | 4.2 | 4.2 |
| Paint | Base agent | Urethane polyol No. | 3 | 4 | 1 | 2 | 4 | 5 | 3 |
|  |  | Number average molecular weight of PTMG | 1000 | 1500 | 650 | 800 | 1500 | 2000 | 1000 |
|  |  | Curing agent/base agent (NCO/OH molar ratio) | 0.80 | 0.80 | 0.54 | 0.68 | 1.06 | 1.64 | 0.85 |
| Paint film |  | 10% elastic modulus Mp (kgf/cm$^2$) | 44 | 29 | 50 | 50 | 50 | 50 | 50 |
|  |  | Thickness Tp (mm) | 0.02 | 0.02 | 0.02 | 0.02 | 0.02 | 0.02 | 0.02 |
|  |  | 200 × [NCO/OH] − 75 | 85 | 85 | 33 | 61 | 137 | 253 | 95 |
|  |  | Absolute value of difference (|Mp − Mc|) (kgf/cm$^2$) | 11 | 26 | 5 | 5 | 5 | 5 | 58 |
|  |  | Difference (Minm − Moum) (kgf/cm$^2$) | 152 | 152 | 152 | 152 | 152 | 152 | 152 |
|  |  | Difference (Moum − Mc) (kgf/cm$^2$) | −5 | −5 | −5 | −5 | −5 | −5 | −58 |
|  |  | (Tinm × Minm)/(Toum × Moum) | 5.1 | 5.1 | 5.1 | 5.1 | 5.1 | 5.1 | 5.1 |
|  |  | (Toum × Moum)/(Tc × Mc) | 2.4 | 2.4 | 2.4 | 2.4 | 2.4 | 2.4 | 1.2 |
|  |  | (Tc × Mc)/(Tp × Mp) | 18.8 | 28.4 | 16.5 | 16.5 | 16.5 | 16.5 | 32.4 |
| Evaluation |  | Compression deformation amount (mm) | 2.4 | 2.4 | 2.4 | 2.4 | 2.4 | 2.4 | 2.3 |
|  |  | Coefficient of restitution | 100 | 100 | 100 | 100 | 100 | 100 | 102 |
|  |  | Spin rate on driver shots (rpm) | 2650 | 2650 | 2650 | 2650 | 2650 | 2650 | 2500 |
|  |  | Flight distance on driver shots (m) | 252 | 252 | 252 | 252 | 252 | 252 | 258 |
|  |  | Spin rate on approach shots (rpm) | 3750 | 3800 | 3650 | 3680 | 3720 | 3750 | 3200 |
|  |  | Shot feeling | G | G | G | G | G | G | F |
|  |  | Stain resistance | G | G | P | G | E | E | G |

The golf balls No. 7 to No. 10 are the cases that the difference (Moum−Mc) is 5 kgf/cm$^2$ or more and the ratio (Toum×Moum)/(Tc×Mc) is 3.0 or more, thus the flight distance thereof on driver shots is short. The golf balls No. 11 to No. 12 are the cases that the difference (Minm−Moum) is 40 kgf/cm$^2$ or less and the ratio (Tinm×Minm)/(Toum× Moum) is 2.0 or less, thus the shot feeling thereof is poor. The golf balls No. 13 and No. 14 are the cases that Tinm≥Toum>Tc>Tp is not satisfied, thus the flight distance thereof on driver shots is short. The golf balls No. 17 and No. 18 are the cases that the ratio (Tc×Mc)/(Tp×Mp) is 10.0 or less, thus the shot feeling thereof is poor. The golf ball No. 21 is the case that a urethane polyol having a polyether diol with a number average molecular weight of less than 800 as a constituent component is used, thus the stain resistance thereof is poor.

The present invention is useful for a painted golf ball. This application is based on Japanese Patent applications No. 2014-266659 filed on Dec. 26, 2014, the contents of which are hereby incorporated by reference.

The invention claimed is:

1. A golf ball comprising: a golf ball body including a spherical core, an inner intermediate layer covering the spherical core, an outer intermediate layer covering the inner intermediate layer, and a cover covering the outer intermediate layer; and a paint film formed on a surface of the golf ball body, wherein a base resin constituting the paint film contains a polyurethane obtained by a reaction between a polyol composition and a polyisocyanate composition, the polyol composition contains a urethane polyol having a polyether diol with a number average molecular weight in a range from 800 to 3,000 as a constituent component, and following requirements are satisfied:

$Mp \leq 200 \times X - 75$ $Mp \leq 100$ $Minm - Moum > 40$ $Moum - Mc < 5$ $Tinm \geq Toum > Tc > Tp$ $(Tinm - Minm)/(Toum - Moum) > 2.0$ $(Toum - Moum)/(Tc - Mc) < 3.0$ $(Tc - Mc)/(Tp - Mp) > 10.0$ wherein
Mp represents a 10% elastic modulus (kgf/cm$^2$) of the paint film,
Minm represents a 10% elastic modulus (kgf/cm$^2$) of the inner intermediate layer,
Moum represents a 10% elastic modulus (kgf/cm$^2$) of the outer intermediate layer, and
Mc represents a 10% elastic modulus (kgf/cm$^2$) of the cover;
Tp represents a thickness (mm) of the paint film,
Tinm represents a thickness (mm) of the inner intermediate layer,
Toum represents a thickness (mm) of the outer intermediate layer, and
Tc represents a thickness (mm) of the cover; and
X represents a molar ratio (NCO/OH) of isocyanate groups (NCO groups) of the polyisocyanate composition to hydroxyl groups (OH groups) of the polyol composition.

2. The golf ball according to claim 1, wherein an absolute value (|Mp−Mc|) of a difference between the 10% elastic modulus Mp of the paint film and the 10% elastic modulus Mc of the cover is 65 kgf/cm$^2$ or less.

3. The golf ball according to claim 1, wherein a proportion occupied by a volume Vc of the cover in the golf ball body is less than 10 vol. %.

4. The golf ball according to claim 1, wherein the 10% elastic modulus Mc of the cover is 100 kgf/cm$^2$ or less.

5. The golf ball according to claim 1, wherein the 10% elastic modulus Minm of the inner intermediate layer is 120 kgf/cm$^2$ or more.

6. The golf ball according to claim 1, wherein a difference (Hs—Ho) between a surface hardness Hs and a center hardness Ho of the spherical core is 20 or more in Shore C hardness.

7. The golf ball according to claim 1, wherein the spherical core includes at least one layer foamed from a rubber composition containing a fatty acid and/or a metal salt thereof, and wherein the fatty acid and/or the metal salt thereof excludes α,β-unsaturated carboxylic acid having 3 to 8 carbon atoms or a metal salt thereof used as a co-crosslinking agent.

8. The golf ball according to claim 1, wherein the spherical core is a dual-layered core composed of an inner core and an outer core covering the inner core.

9. The golf ball according to claim 1, wherein the spherical core has a diameter in a range from 37.0 mm to 40.5 mm.

10. The golf ball according to claim 1, wherein the urethane polyol has a weight average molecular weight in a range from 5000 to 20,000.

11. The golf ball according to claim 1, wherein the polyisocyanate composition contains a biuret product and an isocyanurate product of hexamethylene diisocyanate, and a mass ratio (biuret product/isocyanurate product) of the biuret-modified product to the isocyanurate-modified product ranges from 20/40 to 40/20.

12. The golf ball according to claim 1, wherein the thickness Tinm of the inner intermediate layer ranges from 0.7 mm to 1.6 mm.

13. The golf ball according to claim 1, wherein the thickness Toum of the outer intermediate layer ranges from 0.5 mm to 1.2 mm.

14. The golf ball according to claim 1, wherein the thickness Tc of the cover ranges from 0.1 mm to 0.6 mm.

15. The golf ball according to claim 1, wherein a slab hardness of the inner intermediate layer ranges from 62 to 75 in Shore D hardness.

16. The golf ball according to claim 1, wherein a slab hardness of the outer intermediate layer ranges from 42 to 63 in Shore D hardness.

17. The golf ball according to claim 1, wherein a slab hardness of the cover ranges from 40 to 65 in Shore D hardness.

18. The golf ball according to claim 1, wherein a proportion occupied by a volume Vinm of the inner intermediate layer in the golf ball body is 18.0 vol % or less.

19. The golf ball according to claim 1, wherein a proportion occupied by a volume Voum of the outer intermediate layer in the golf ball body is 15.0 vol % or less.

20. The golf ball according to claim 1, wherein the 10% elastic modulus Moum of the outer intermediate layer is 35 kgf/cm$^2$ or more.

21. The golf ball according to claim 1, wherein Moum−Mc<0.

22. The golf ball according to claim 1, wherein $(Tinm \times Minm)/(Toum \times Moum) \leq 8.0.$ 23. The golf ball according to claim 1, wherein in a reaction between the polyol composition and the polyisocyanate composition, a molar ratio (NCO groups/OH groups) of isocyanate groups (NCO groups) of the polyisocyanate composition to hydroxyl groups (OH groups) of the polyol composition is more than 0.5 and 0.85 or less.

* * * * *